(12) United States Patent
Im et al.

(10) Patent No.: US 10,600,070 B2
(45) Date of Patent: Mar. 24, 2020

(54) SERVICE PROVIDING DEVICE, TERMINAL, WIRELESS CHARGING SYSTEM COMPRISING THE SAME, CONTROL METHOD THEREOF AND COMPUTER READABLE MEDIUM HAVING COMPUTER PROGRAM RECORDED THEREFOR

(71) Applicant: SK PLANET CO., LTD., Gyeonggi-Do (KR)

(72) Inventors: Joon Sok Im, Seoul (KR); Hyun Wook Kim, Gyeonggi-Do (KR); Yon Won Park, Gyeonggi-Do (KR); Hyung Min Jin, Seoul (KR); Seung Won Na, Seoul (KR); Seong Wook Kang, Gyeonggi-Do (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 803 days.

(21) Appl. No.: 14/790,372

(22) Filed: Jul. 2, 2015

(65) Prior Publication Data
US 2016/0005068 A1    Jan. 7, 2016

(30) Foreign Application Priority Data

Jul. 2, 2014   (KR) .................. 10-2014-0082261
Jul. 2, 2014   (KR) .................. 10-2014-0082365
Jul. 7, 2014   (KR) .................. 10-2014-0084293

(51) Int. Cl.
  *G06Q 30/00*   (2012.01)
  *G06Q 30/02*   (2012.01)
  (Continued)

(52) U.S. Cl.
  CPC ..... *G06Q 30/0237* (2013.01); *G06Q 30/0212* (2013.01); *G06Q 30/0238* (2013.01);
  (Continued)

(58) Field of Classification Search
  CPC .................................................. G06Q 30/0237
  See application file for complete search history.

(56) References Cited

U.S. PATENT DOCUMENTS

| | | | |
|---|---|---|---|
| 2008/0040229 A1* | 2/2008 | Gholston | ........... G06Q 30/0235 705/14.35 |
| 2010/0007307 A1* | 1/2010 | Baarman | ................. H02J 5/005 320/108 |

(Continued)

*Primary Examiner* — Bennett M Sigmond
*Assistant Examiner* — Scott C Anderson
(74) *Attorney, Agent, or Firm* — Fenwick & West LLP

(57) ABSTRACT

The present invention provides a service providing device and a terminal, a wireless charging system including the service providing device and the terminal, a control method thereof, and a computer readable medium having a computer program. That is, according to the present invention, in any one of cases when a terminal is intended to be charged by a wireless charging device, when a terminal is recognized by a wireless charging device, and when a terminal is in the BLE range of a wireless charging device, a product is selected through a corresponding terminal on the basis of product information provided from a POS terminal or a service providing device, a function of ordering the selected product is performed, and a function of paying for the selected product is performed, such that the wireless charging system can be used in more fields and more conveniently used.

2 Claims, 11 Drawing Sheets

(51) Int. Cl.
 *H04B 5/00* (2006.01)
 *G06Q 30/06* (2012.01)
 *H04W 4/80* (2018.01)
(52) U.S. Cl.
 CPC ..... *G06Q 30/0267* (2013.01); *G06Q 30/0603* (2013.01); *H04B 5/0037* (2013.01); *H04W 4/80* (2018.02)

(56) References Cited

U.S. PATENT DOCUMENTS

| | | | | |
|---|---|---|---|---|
| 2010/0225272 | A1* | 9/2010 | Kirby | H04B 5/00 |
| | | | | 320/108 |
| 2011/0312288 | A1* | 12/2011 | Fu | H04B 1/406 |
| | | | | 455/88 |
| 2012/0055985 | A1* | 3/2012 | Allen | G06Q 10/08 |
| | | | | 235/375 |
| 2013/0293355 | A1* | 11/2013 | Christopher | G06K 7/10376 |
| | | | | 340/10.1 |

* cited by examiner

| SECTION1 | SECTION2 | SECTION3 | SECTION4 |
|---|---|---|---|
| 11-TH PRODUCT O | 21-TH PRODUCT | 31-TH PRODUCT | 41-TH PRODUCT O |
| 12-TH PRODUCT | 22-TH PRODUCT O | 32-TH PRODUCT | 42-TH PRODUCT O |
| 13-TH PRODUCT O | 23-TH PRODUCT | 33-TH PRODUCT O | 43-TH PRODUCT |
| 14-TH PRODUCT | 24-TH PRODUCT O | 34-TH PRODUCT O | 44-TH PRODUCT |

O CONTACT WITH PRODUCT (TOUCHING, CHECKING PRICE TAG, READING OPERATING MANUAL)

FIG. 15

| FIRST TERMINAL (USER 1) | SECTION 1 | SECTION 2 | SECTION 3 | SECTION 4 | POINT |
|---|---|---|---|---|---|
| CONTACT PRODUCT | 2/2 | 2/1 | 2/2 | 2/2 | |
| CONTACT TIME(sec) | 100/20 | 50/50 | 100/100 | 100/200 | 82% |
| WEIGHT (POINT) | 20% | 50% | 100% | 200% | |

⇨ WI-FI SIGNAL

⇨ WIRELESS CHARGING INTENSITY

FIG. 16

| CONTROL | FIRST TERMINAL | SECOND TERMINAL | THIRD TERMINAL | FOURTH TERMINAL | FIFTH TERMINAL | SIXTH TERMINAL | SEVENTH TERMINAL |
|---|---|---|---|---|---|---|---|
| WI-FI Intensity | 80% | 70% | 60% | 10% | 12% | 15% | 62% |
| Wireless Charging Intensity | 82% | 75% | 67% | 15% | 15% | 17 | 68% |

FIG. 17

SERVICE PROVIDING DEVICE, TERMINAL, WIRELESS CHARGING SYSTEM COMPRISING THE SAME, CONTROL METHOD THEREOF AND COMPUTER READABLE MEDIUM HAVING COMPUTER PROGRAM RECORDED THEREFOR

CROSS-REFERENCE TO RELATED APPLICATION

This application claims the benefit of Korean Application Nos. 10-2014-0082261 filed on Jul. 2, 2014, 10-2014-0082365 filed on Jul. 2, 2014 and 10-2014-0084293 filed on Jul. 7, 2014 with the Korean Intellectual Property Office, the disclosure of which is incorporated herein by reference.

BACKGROUND OF THE INVENTION

1. Field of the Invention

The present invention relates to a service providing device, a terminal, a wireless charging system including the same, a control method thereof, and a computer readable medium having a computer program recorded therefor. In particular, the present invention relates to a service providing device that classifies terminals into a user group pertaining to one table and performs functions of selecting product/menu, ordering, and paying from one or more terminals in the corresponding user group, in one of cases when a terminal is charged by a wireless charging device, when a terminal is detached from a wireless charging device after being attached to it, and when a terminal is in the range of BLE of a wireless charging device, a terminal, a wireless charging system including the service providing device and the terminal, a control method thereof, and a computer readable medium having a computer program.

Further, the present invention relates to a wireless charging device that classifies terminals into a user group pertaining to one table and shares contents among one or more terminal in the corresponding user group, in one of cases when a terminal is charged by a wireless charging device, when a terminal is detached from a wireless charging device after being attached to it, and when a terminal is in the range of BLE of a wireless charging device, a terminal, a wireless charging system including the wireless charging device and the terminal, a control method thereof, and a computer readable medium having a computer program.

Further, the present invention relates to a server that allocates different wireless charging intensity and Wi-Fi transmission intensity corresponding to terminals and provides a predetermined coupon to a corresponding terminal by controlling a wireless charging device in a corresponding store and a Wi-Fi access point, when a BLE terminal entering the store moves to a plurality of predetermined sections (or movement lines), a wireless charging device, a terminal, a wireless charging system including the server, the wireless charging device, and the terminal, a control method thereof, and a computer readable medium having a computer program.

2. Description of the Related Art

A wireless charging device (or wireless power transmission device) is a power transmission device that wirelessly transmits power required by an electronic device.

Such a wireless charging device communicates with a terminal close to it and transmits a charging signal to the corresponding terminal, and the battery of the corresponding terminal is charged on the basis of the charging signal, so it is not efficient in that it cannot provide other services than charging of a battery.

PRIOR ART DOCUMENT

Patent Document

Korean Patent No. 10-1228506 [Title: Wireless charging system that combines smart card function]

Korean Patent Publication No. 10-2013-0026377 [Title: Communication apparatus and communication method in wireless power transfer system]

Korean Patent Publication No. 10-2011-0083831 [Title: Interactive visual interface system displaying personalized products information in the process of off-line shopping]

SUMMARY OF THE INVENTION

An object of the present invention is to provide a service providing device that selects a product through the corresponding terminal on the basis of product information provided from a POS terminal or the service providing device, performs a function of ordering the selected product, and performs a function of paying for the selected product, in any one of cases when a terminal is intended to be charged by a wireless charging device, when a terminal is recognized by a wireless charging device, and when a terminal is in the BLE range of a wireless charging device, a terminal, a wireless charging system including the service providing device and the terminal, a control method thereof, and a computer readable medium having a computer program.

Another object of the present invention is to provide a wireless charging device that classifies terminals into a user group pertaining to one table and shares contents among one or more terminal in the corresponding user group, in one of cases when a terminal is charged by a wireless charging device, when a terminal is detached from a wireless charging device after being attached to it, and when a terminal is in the range of BLE of a wireless charging device, a terminal, a wireless charging system including the wireless charging device and the terminal, a control method thereof, and a computer readable medium having a computer program.

Another object of the present invention is to provide a server that allocates different wireless charging intensity and Wi-Fi transmission intensity corresponding to terminals and provides a predetermined coupon to a corresponding terminal by controlling a wireless charging device in a corresponding store and a Wi-Fi access point, when a BLE terminal entering the store through BLE additionally defined in wireless charging of an A4WP (Alliance for Wireless Power) type moves to a plurality of predetermined sections (or movement lines), a wireless charging device, a terminal, a wireless charging system including the server, the wireless charging device, and the terminal, a control method thereof, and a computer readable medium having a computer program.

According to an aspect of the present invention, a service providing device may include: a communication unit that communicates with a terminal or a wireless charging device; and a control unit that classifies the terminal into a user group pertaining to a table corresponding to the wireless charging device and controls the communication unit to transmit information of products in a store, where the wireless charging device is disposed, price information of the products, order option information of the products, discount coupon information, different discount rate information according to customer levels, and price discount information relating to promotion at predetermined times to the terminal, in any one of cases when the terminal is being charged through the wireless charging device, when the terminal is recognized by the wireless charging device, and when the terminal is within a BLE (Bluetooth Low Energy) range of the wireless charging device.

As an example of the present invention, the control unit may classify the terminal into a user group pertaining to a table corresponding to information about a table on the basis of information about the terminal transmitted from the wireless charging device and the information about the table, where the wireless charging device is positioned.

As an example of the present invention, the control unit may perform an ordering function on the basis of a product selected from the transmitted information about a product, an option for the product, and the number of the product.

As an example of the present invention, the control unit may perform a paying function for one or more products selected by the terminal in the transmitted product information in cooperation with a POS terminal.

As an example of the present invention, the paying function may be performed on the basis of a paying means and a paying way selected by the terminal.

As an example of the present invention, the paying means may include at least one of cash, a credit card, a reserve card, and a discount card, and the paying way may include cases when the terminal performing the ordering function pays, when one or more terminals included in the user group pay divisionally, when one or more terminals included in the user group pay for selected products, respectively, and when a person who will pay is determined by lottery through a game and pays.

As an example of the present invention, in any one of cases when predetermined intervals are set, when one or more terminals in the user group sends an order state information request, an when a procedure state of an ordered product changes, the control unit may control the communication unit to transmit ordering state information to one or more terminals in the user group.

As an example of the present invention, the order state information may include information about a product ordered by the terminals in the user group, price information of the ordered product, discount information of the ordered product, and procedure state information of the ordered product.

As an example of the present invention, when the terminal moves from the current table to a new table, information about the new table transmitted from the terminal may be received through the communication unit, and the control unit may control the communication unit to update the information about the product ordered by the terminal to order state information in another user group pertaining to the new table information on the basis of the received information about the new table and to transmit order state information in the updated new table to the terminal.

According to another aspect of the present invention, a wireless charging device may include; a communication unit that communicates with a terminal; and a control unit that classifies the terminal into a user group pertaining to a table corresponding to the wireless charging device, controls the communication unit to transmit a sharing inquiry signal to the terminal, and controls contents to be shared between a plurality of terminals included in the user group on the basis of a response signal transmitted from the terminal in response to the transmitted sharing inquiry signal, in any one of cases when the terminal is being charged through a wireless charging device including the communication unit, when the terminal is recognized by the wireless charging device, and when the terminal is within a BLE (Bluetooth Low Energy) range of the wireless charging device.

As an example of the present invention, the control unit may classify the terminal, which is in the BLE range of the wireless charging device, into a user group pertaining to a table corresponding to information about a table on the basis of information about the terminal and the information about the table where the wireless charging device is positioned.

As an example of the present invention, the sharing inquiry signal may be a signal for asking whether to mutually share contents among a plurality of terminals in the user group or a signal for asking whether to mutually share contents, which are provided from the wireless charging device or a service providing device, among the plurality of terminals.

As an example of the present invention, when information saying agreement to contents sharing, sharing object information, sharing time information, and sharing item information are included in the response signal, the control unit may control contents corresponding to the sharing item information to be shared among a plurality of terminals in the user group on the basis of the sharing object information, sharing time information, and sharing item information.

As an example of the present invention, the contents may include at least one of image, audio, video, moving image, game, and map information provided from a map providing program.

As an example of the present invention, the control unit may create sharing state information and control the communication unit to transmit the created sharing state information to a service providing device.

As an example of the present invention, the sharing state information may include information about a user group corresponding to the wireless charging device, information about one or more terminals in the user group, identification information of the wireless charging device, information about sharing objects of the terminals, information about sharing time of the terminals, information about sharing items of the terminals, and conversation.

As an example of the present invention, the control unit may control the communication unit to transmit additional service information, which is transmitted from the service providing device, to a terminal corresponding to the additional service information in a plurality of terminals in the user group, in response to the transmitted sharing state information.

According to an aspect of the present invention, a server may include: a communication unit that receives estimation information of touched products of products in predetermined sections, which is transmitted from a terminal in a store; and a control unit calculates a terminal point on the basis of information about products that is included in the estimation information and that has been touched by the terminal, contact time, and section information, creates respectively a first control signal for adjusting wireless charging intensity of the wireless charging device and a second control signal for adjusting Wi-Fi transmission intensity of a Wi-Fi access point on the basis of the calculated terminal point, controls the communication unit to transmit the created first control signal to the wireless charging device, and controls the communication unit to transmit the created second control signal to the Wi-Fi access point.

As an example of the present invention, the control unit may calculate the terminal point on the basis of at least one of whether the terminal has sequentially moved in the order of predetermined section information, whether the terminal has touched predetermined one or more products in sections, and whether the terminal has touched predetermined products for a predetermined time or more.

As an example of the present invention, the control unit may find out wireless charging intensity corresponding to the calculated terminal point in wireless charging intensity at, predetermined terminal points and may create the first control signal including the found-out wireless charging intensity and identification information of the terminal.

As an example of the present invention, the control unit may find out Wi-Fi transmission intensity corresponding to the calculated terminal point in Wi-Fi transmission intensity at predetermined terminal points and may create the second control signal including the found-out Wi-Fi transmission intensity and identification information of the terminal.

As an example of the present invention, the control unit may provide a predetermined coupon to the terminal, when the calculated terminal point is a predetermined point or more.

According the present invention, in any one of cases when a terminal is intended to be charged by a wireless charging device, when a terminal is recognized by a wireless charging device, and when a terminal is in the BLE range of a wireless charging device, a product is selected through a corresponding terminal on the basis of product information provided from a POS terminal or a service providing device, a function of ordering the selected product is performed, and a function of paying for the selected product is performed, such that the wireless charging system can be used in more fields and more conveniently used.

Further, according to the present invention, in any one of cases when a terminal is charged by a wireless charging device, when a terminal is detached from a wireless charging device after being attached to it, and when a terminal is in the BLE range of a wireless charging device, the terminal is classified into a user group in one table and contents are shared between one or more terminals in the corresponding user group, so the wireless charging system can be used in more fields and more conveniently used.

Further, according to the present invention, when a BLE terminal entering a store through BLE additionally defined in wireless charging of an A4WP type moves to a plurality of predetermined sections (or movement lines), predetermined wireless charging intensity and Wi-Fi transmission intensity are supplied to the corresponding terminal by controlling a wireless charging device and a Wi-Fi access point in the corresponding store and a predetermined coupon is provided to the corresponding terminal, so it is possible to measure a user foot traffic of the terminal. Further, it is possible to reflect a compensation system for each customer by setting configuration of products and adjusting signal intensity, it is possible to independently promote an offline store, and it is possible to induce an interest of a user.

BRIEF DESCRIPTION OF THE DRAWINGS

FIG. 15 is a diagram illustrating products and predetermined necessary contact products in stores according to an embodiment of the present invention.

FIG. 16 is a diagram illustrating calculation of terminal points according to an embodiment of the present invention.

FIG. 17 is a diagram illustrating wireless charging intensity and Wi-Fi transmission intensity to terminals according to an embodiment of the present invention.

DETAILED DESCRIPTION OF THE PREFERRED EMBODIMENTS

Figure 1:
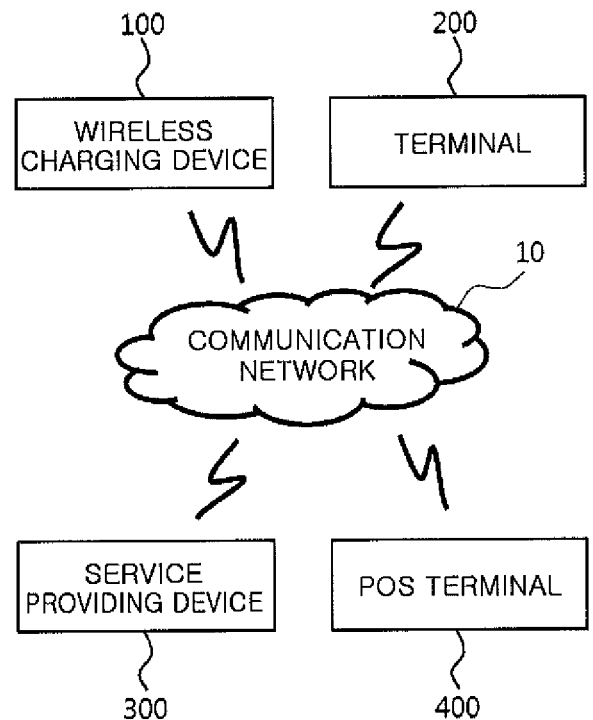
FIG. 1 is a block diagram illustrating the configuration of a wireless charging system according to an embodiment of the present invention.

Terminologies used in the specification are used to explain particular embodiments and are not intended to limit the scope of the invention. In addition unless stated specifically otherwise in the specification, the terminologies used in the specification should be construed to have meanings generally understood by those skilled in the art but should not be construed to have unduly exaggerated or reduced meanings. In addition, even if the terminologies used in the specification are incorrect terminologies in expressing the idea of the present invention, these incorrect terminologies should be replaced with correct terminologies so that those skilled in the art can correctly understand the present invention. Moreover, general terms used in the specification should be construed as defined in the dictionary or according to the context and should not be construed to have unduly reduced meanings.

Hereinafter, preferred embodiments of the present invention will be described in detail with reference to the accompanying drawings so that those skilled in the art can easily practice the preferred embodiments. Throughout the drawings, the same or similar elements are denoted by the same reference numerals and explanation of which will not be repeated for the purpose of brevity of description. In the following detailed description of the present invention, concrete description on related functions or constructions will be omitted if it is deemed that the functions and/or constructions may unnecessarily obscure the gist of the present invention. Accordingly, embodiments described in the specification and elements illustrated in the drawings are illustrative only and do not cover all of the technical ideas of the present invention. It should be, therefore, understood that these embodiments and elements may be replaced with different equivalents and modifications at the point of time of filing the present application.

FIG. 1 is a block diagram illustrating the configuration of a wireless charging system 10 according to an embodiment of the present invention.

As illustrated in FIG. 1, the wireless charging system 10 includes a wireless charging device 100, a terminal 200, a service providing device 300, and a POS terminal 400. The components of the wireless charging system 10 illustrated in FIG. 1 are not all necessary components, and the wireless charging system 10 may be composed of components much or less than the components illustrated in FIG. 1. The wireless charging device 100 and the terminal 200 are operated by A4WP (Alliance for Wireless Power) (or in magnetic resonance type) and a battery of the corresponding terminal 200 is charged on the basis of a charging signal from the wireless charging device 100. BLE (Bluetooth Low Energy) is used for the corresponding wireless charging device 100 and the terminal 200.

When a predetermined event, such as cases when the terminal is charged by the wireless charging device 100, when the terminal 200 is detached from the wireless charging device 100 after being attached to it (or when the terminal 200 communicates with the wireless charging device 100 or when the terminal 200 is recognized by the wireless charging device 100), and when the terminal is in a BLE range of the wireless charging device 100, occurs, the service providing device 300 classifies the terminal 200 in a store, where the wireless charging device 100 is disposed, into a user group pertaining to one table. Further, the service providing device 300 transmits information of products (or menu information) in the store, where a corresponding wireless charging device 100 is disposed, price information of the products, order option information of the products, discount coupon information, different discount rate information according to customer levels, and price discount information relating to promotion at predetermined times to the terminal 200. Thereafter, when a corresponding terminal 200 in the user group selects one or more products, a function of ordering and paying for the selected products is performed by cooperation of the terminal 200, the service providing device 300, and the POS terminal 400.

Figure 2:
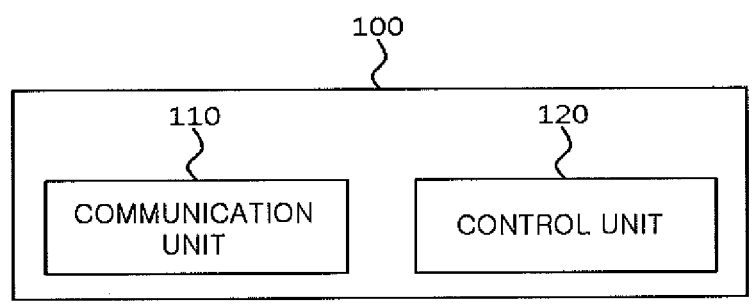
FIG. 2 is a block diagram illustrating the configuration of a wireless charging device according to an embodiment of the present invention.

As illustrated in FIG. 2, the wireless charging device (or wireless charger) (Power Transmitting Unit, PTU) 100 includes a communication unit 110 and a control unit 120. The components of the wireless charging device 100 illustrated in FIG. 2 are not all necessary components, and the wireless charging device 100 may be composed of components much or less than the components illustrated in FIG. 2.

The communication unit 110 communicates with another terminal using a BLE type, using BLE (Bluetooth Low Energy).

Further, the communication unit 110 is controlled by the control unit 120 to transmit a power beacon signal to communicate with another terminal using the BLE type.

The control unit 120 controls the entire function of the wireless charging device 100.

Further, the control unit 120 creates power beacon signal at predetermined intervals in wireless charging of A4WP type.

Further, the control unit 120 transmits the created power beacon signals at predetermined intervals through the communication unit 110.

Further, the control unit 120 receives control signal (for example, a PRU advertisement signal), which is transmitted from the terminal 200 receiving a corresponding power beacon signal, through the communication unit 110 in response to the power beacon signal.

Further, the control unit 120 communicates with a corresponding terminal 200 close to a corresponding wireless charging device 100 on the basis of the received control signal.

Further, the control unit 120 schedules a time for transmitting a corresponding charging signal to one or more terminals 200 connected with a corresponding wireless charging device 100, in a time slot (or time sequence/time for which entire data can be transmitted), in order to transmit the corresponding charging signal to one or more terminals 200 connected with the corresponding wireless charging device 100.

Further, the control unit 120 creates a charging signal by controlling an inductor (not illustrated) and a capacitor (not illustrated) included in the wireless charging device 100. In this process, the wireless charging device 100 creates a charging signal for wireless charging in a resonant coupling type.

Further, the control unit 120 transmits a charging signal created on the basis of the scheduled time slot to a specific terminal of the terminals 200 connected to a corresponding wireless charging device 100, at predetermined intervals (for example, 250 ms).

In this process, when a plurality of terminals 200 is connected to the corresponding wireless charging device 100, the control unit 120 can create individual charging signals to transmit to the terminals 200 and transmit the created charging signals to the terminals 200, respectively. Further, when a plurality of terminals 200 is connected to the corresponding wireless charging device 100, the control unit 120 may create one charging signal to transmit to the terminals 200 and transmit the charging signal to the terminals 200.

Further, the control unit 120 may transmit a charging signal to a corresponding terminal 200 on the basis of a control signal (or a charging signal transmission request signal) (for example, including a PRU dynamic parameter) transmitted from the terminal 200.

Further, when a predetermined event, such as cases when the terminal is charged by the wireless charging device 100, when the terminal 200 is detached from the wireless charging device 100 after being attached to it (or when the terminal 200 communicates with the wireless charging device 100 or when the terminal 200 is recognized by the wireless charging device 100), and when the terminal is in a BLE range of the wireless charging device 100, occurs, the control unit 120 receives the information of the terminal 200 transmitted from the corresponding terminal 200 through the communication unit 110. Herein, the information of the terminal 200 includes such as IMSI (International Mobile Subscriber Identity) of a USIM in the terminal 200 and specific IMEI (International Mobile Equipment Identity) of the terminal 200. In this process, the IMSI includes an MCC (Mobile Country Code), an MNC (Mobile Network Code), MSI (Mobile Subscriber Identity), and an MSIN (Mobile Subscriber Identifier Number). Further, the IMEI includes the specific serial number of a terminal, the manufacturer of a terminal, and model information.

Further, the control unit 120 transmits the received information of the terminal 200, identification information of the wireless charging device 100, information of table, where a corresponding wireless charging device 100 is, to the service providing device 300 through the communication unit 110.

Further, the control unit 120 receives information of products in the store, where a corresponding wireless charging device 100 is disposed, price information of the products, order option information of the products, discount coupon information, different discount rate information according to customer levels, and price discount information relating to promotion at predetermined times, which are transmitted from the service providing device 300, through the communication unit 110 in response to the transmitted information of the terminal 200.

Further, the control unit 120 transmits respectively the received information (for example, including information of products in the store, where a corresponding wireless charging device 100 is disposed, price information of the products, order option information of the products, discount coupon information, different discount rate information according to customer levels, and price discount information relating to promotion at predetermined times, which are transmitted from the service providing device 300) to one or more terminals 200 in the corresponding user group, through the communication unit 110.

Figure 3:
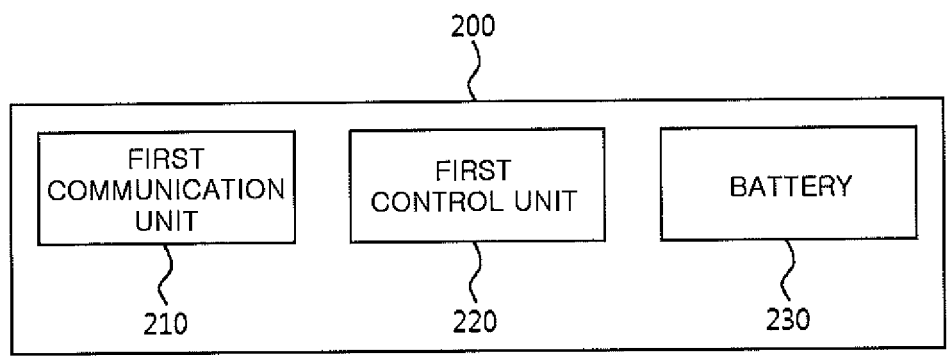
FIG. 3 is a block diagram illustrating the configuration of a terminal according to an embodiment of the present invention.

As illustrated in FIG. 3, the terminal 200 includes a first communication unit 210, a first control unit 220, and a battery 230. The components of the terminal 200 illustrated in FIG. 3 are not all necessary components, and the terminal 200 may be composed of components much or less than the components illustrated in FIG. 3. Herein, the terminal 200 includes a PRU (Power Receiving Unit) (not illustrated).

The first communication unit 210 communicates with other terminals, which use a BLE type, using BLE.

Further, the first communication unit 210 receives a power beacon signal transmitted from the wireless charging device 100.

The first control unit 220 controls the entire function of the terminal 200.

Further, the first control unit 220 transmits a control signal (for example, a PRU advertisement signal) to the wireless charging device 100 through the first communication unit 210 in order to request connection (or communication) of the corresponding wireless charging device 100 on the basis of the power beacon signal transmitted from the wireless charging device 100, in wireless charging of an A4WP type.

Further, the first control unit 220 connects (or communicates) with the corresponding wireless charging device 100 on the basis of the transmitted control signal.

Further, the first control unit 220 transmits a control signal (or a charging signal transmission request signal) (for example, including a PRU dynamic parameter) to the wireless charging device 100 at predetermined intervals.

Further, the first control unit 220 controls the terminal to receive charging signals transmitted at predetermined intervals from the wireless charging device 100 through the first communication unit 210. In this process, the first control unit 220 may control the terminal to receive a charging signal from the wireless charging device 100 through the first communication unit 210 in response to the previous control signal (for example, including a PRU dynamic parameter).

Further, the first control unit 220 charges the battery 230 on the basis of a received charging signal. In this process, the terminal 200 may further include additional components for charging the corresponding battery 230 in the resonant coupling type with the wireless charging device 100.

Further, when a predetermined event occurs, the first control unit 220 transmits the information of the terminal 200 to the wireless charging device 100 (or the service providing device 300) through the first communication unit 210. Herein, the information of the terminal 200 includes the IMSI of a USIM in the terminal and the specific IMEI of the terminal 200.

Further, the first control unit 220 receives information of products in the store, where the corresponding wireless charging device 100 is disposed, price information of the products, order option information of the products, discount coupon information, different discount rate information according to customer levels, and price discount information relating to promotion at predetermined times, which are transmitted from the corresponding wireless charging device 100, through the first communication unit 210 at an idle period (or a waiting period) in which a charging signal is not transmitted/received to/from the service providing device 300 or the wireless charging device 100.

Further, the first control unit 220 displays the received information of products in the store, price information of the products, order option information of the products, discount coupon information, different discount rate information according to customer levels, and price discount information relating to promotion at predetermined times, through a display unit (not illustrated).

Further, when one or more products from the information displayed on the display unit are selected, the first control unit 220 performs a function of ordering one or more selected products in cooperation with the service providing device 300 and the POS terminal 400. Herein, the ordering function includes selecting a product, a product option, and the number of a product.

Further, the first control unit 220 performs a function of paying for one or more selected products in cooperation with the service providing device 300 and the POS terminal 400.

In this process, in paying, a paying means and a paying way may be selected (or set) in one or more terminals 200 in the user group including the corresponding terminal 200.

That is, in paying, a paying means (for example, including cash, a credit card, and a reserve/discount card) is selected and a paying way is selected for one or more terminals 200 in the same user group. Herein, the paying way may include cases when the corresponding terminal 200 that orders the product pays, when one or more terminals 200 in the user group pay divisionally, when one or more terminals 200 in the user group pay for selected products, respectively, and when a person (or a terminal) who will pay is determined by lottery through a game. In this process, the corresponding game may include a ladder game and rock-scissors-paper.

Further, the first control unit 220 receives the result of paying from the service providing device 300 or the POS terminal 400 and displays the received result of paying on the display unit.

Further, the first control unit 220 receives order state information transmitted from the service providing device 300 through the first communication unit 210 at predetermined intervals and displays the received order state information on the display unit. Herein, the order state information includes the information of products (or menus) ordered by one or more terminals 200 in the corresponding user group, the price information of the ordered products, the discount information/coupon use information/reserve information of the ordered products, procedure information of the ordered products (for example, including 'order received', 'in cooking', 'in service', and 'delivery completed').

Further, when the procedure state of the ordered product changes, the first control unit 220 receives order state information transmitted from the service providing device 300 through the first communication unit 210 and displays the received order state information on the display unit.

Further, the first control unit 220 creates an order state information request signal to check the current order state and transmits the created order state information request signal to the service providing device 300 through the first communication unit 210.

Further, the first control unit 220 receives order state information transmitted from the service providing device 300 through the first communication unit 210 in response to the transmitted order state information request signal and displays the received order state information on the display unit.

Further, when a predetermined moving button displayed on the display unit is selected to move from the current table to a new table and it moves to a new table (or a new table number displayed on the display unit is selected), the first control unit 220 transmits the changed information, that is, the information of the new table (for example, including identification information of a second table, and the like.) to the service providing device 300 through the first communication unit 210.

Further, the first control unit 220 receives order state information in the new table updated with product information selected by the corresponding terminal 200 moving to the table, which is transmitted from the service providing device 300, through the first communication unit 210 in response to the transmitted new table information.

Further, the first control unit 220 displays the received updated order state information in the new table on the display unit.

The battery 230 supplies power to the corresponding terminal 200.

Further, the battery 230 is charged on the basis of a charging signal transmitted from the wireless charging device 100 controlled by the first control unit 220.

Figure 4:
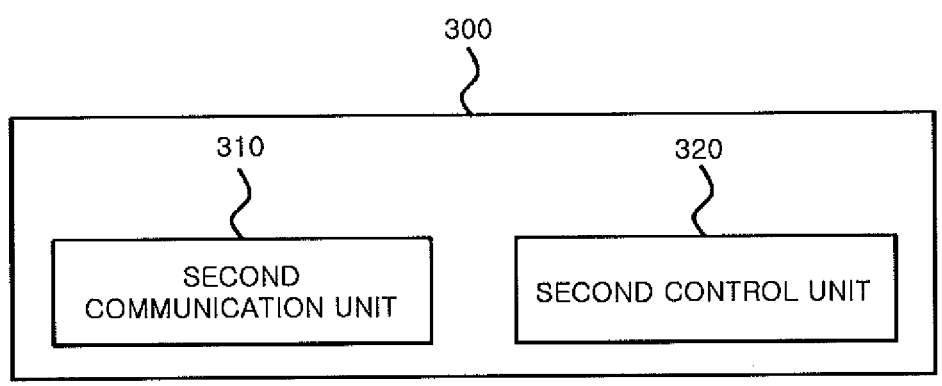
FIG. 4 is a block diagram illustrating the configuration of a service providing device according to an embodiment of the present invention.

As illustrated in FIG. 4, the service providing device 300 includes a second communication unit 310 and a second control unit 320. The components of the service providing device 300 illustrated in FIG. 4 are not all necessary components, and the service providing device 300 may be composed of components much or less than the components illustrated in FIG. 4.

The second communication unit 310 communicates with internal components or at least one external terminal through a wire/wireless communication network. In this process, the external terminal may include the wireless charging device 100, the terminal 200, and the FOS terminal 400.

Further, the second communication unit 310 is controlled by the second control unit 320 to receive the information about the terminal 200, the identification information of the wireless charging device 100, and the information of the table including the corresponding wireless charging device, which are transmitted from the wireless charging device 100. Herein, the information of the terminal 200 includes the IMSI of a USIM in the terminal and the specific IMEI of the terminal 200.

The second control unit 320 controls the entire function of the service providing device 300.

Further, when a predetermined event, such as cases when the terminal is charged by the wireless charging device 100, when the terminal 200 is detached from the wireless charging device 100 after being attached to it (or when the terminal 200 communicates with the wireless charging device 100 or when the terminal 200 is recognized by the wireless charging device 100), and when the terminal is in a BLE range of the corresponding wireless charging device 100, occurs, the second control unit 320 classifies the terminal 200 in the store where the wireless charging device 100 is disposed (or the terminal 200 in the BLE range of the corresponding wireless charging device 100) into a user group pertaining to one table.

In this process, when a plurality of wireless charging devices 100 is disposed in a corresponding store, specific identification information is allocated to the wireless charging device 100, and the second control unit 320 can classify the terminal 200 in the BLE range of a specific wireless charging device 100 of the corresponding wireless charging devices 100 into a user group pertaining to the corresponding table where the corresponding wireless charging device 100 is positioned (or formed).

That is, when a predetermined even occurs, the second control unit 320 classifies the corresponding terminal in the BLE range of the corresponding wireless charging device 100 into a user group pertaining to one table, on the basis of the information of the corresponding terminal 200 provided from the wireless charging device 100 and the information of the table where the corresponding wireless charging device 100 is positioned.

Further, the second control unit 320 checks the information of the products in a corresponding store in the product information of each store kept in a storage unit (not illustrated).

Further, the second control unit 320 transmits (or provides) information of products in the store, where the corresponding wireless charging device 100 relating to a corresponding store is disposed, price information of the products, order option information of the products, discount coupon information, different discount rate information according to customer levels, and price discount information relating to promotion at predetermined times to the terminal 200 through the second communication unit 310. In this process, the second control unit 320 may transmit the corresponding information to the terminal 200 through (or via) the wireless charging device 100.

Further, the second control unit 320 performs a function of ordering one or more products selected by the terminal 200 in the transmitted corresponding information in cooperation with the terminal 200 and the POS terminal 400. Herein, the ordering function includes selecting a product, a product option, and the number of a product.

Further, the second control unit 320 performs a function of paying for one or more products selected by the terminal 200 in the transmitted corresponding information in cooperation with the terminal 200 and the POS terminal 400. Herein, the paying function may performed by one or more terminals 200 included in a corresponding user group in accordance with a paying means and a paying way. In this process, the paying way may include cases when the corresponding terminal 200 that orders the product pays, when one or more terminals 200 in the user group pay divisionally, when one or more terminals 200 in the user group pay for selected products, respectively, and when a person who will pay is determined by lottery through a game. Further, the corresponding game may include such as a ladder game and rock-scissors-paper.

Further, the second control unit 320 provides the result of performing the paying function to the terminal 200 through the second communication unit 310 in cooperation with the POS terminal 400.

Further, the second control unit 320 transmits order state information about products ordered by the user group including the corresponding terminal to one or more terminals 200 in the corresponding user group through the second communication unit 310 at predetermined intervals. Herein, the order state information includes the information of products (or menus) ordered by one or more terminals 200 in the corresponding user group, the price information of the ordered products, the discount information/coupon use information/reserve information of the ordered products, procedure information of the ordered products (for example, including 'order received', 'in cooking', 'in service', and 'delivery completed').

Further, when the procedure state of ordered products changes, the second control unit 320 transmits the order state information about the products ordered by the user group including the corresponding terminal to one or more terminals 200 in the corresponding user group through the second communication unit 310.

Further, the second control unit 320 receives an order state information request signal transmitted from the terminal 200 through the second communication unit 310 in order to check the current order state.

Further, the second control unit 320 transmits order state information about products ordered by the user group including the corresponding terminal 200 to one or more terminals 200 in the corresponding user group through the second communication unit 310, in response to the received order state information request signal.

Further, when the terminal 200 moves to a new table from the current terminal, the second control unit 320 receives changed information (or the information of the new table) (for example, including identification information of a second table) from the terminal 200 through the second communication unit 310.

Further, the second control unit 320 updates the information of the product selected (or ordered) by the corresponding terminal 200 from the order state information in the user group including the new table information on the basis of the received information about the new table.

Further, the second control unit 320 transmits the order state information in the new table updated with the information of the product selected by the corresponding terminal 200 moving to the new table to a corresponding terminal 200 (or the terminal 200 moving to the new table) through the second communication unit 310.

Further, even though the corresponding battery 230 finishes (or stops) being charged by cooperation of the wireless charging device 100 and the terminal 200 (or when the corresponding terminal 200 is not in contact with the wireless charging device 100), the functions of ordering, paying, checking the order state after paying, and the like, can be continuously performed by cooperation of the wireless charging device 100, the terminal 200, the service providing device 300, and the POS terminal 400, as long as the terminal 200 is within the service radius of the wireless charging device 100 (or as long as the terminal is in the store where the wireless charging device 100 is disposed).

The POS (Point Of Sale) terminal 400 performs a function of paying for a product selected by the terminal 200 in cooperation with the wireless charging device 100, the terminal 200, and the service providing device 300.

Further, the POS terminal 400 provides the result of paying to the terminal 200 or the service providing device 300.

The functions performed by the service providing device 300 described in embodiments of the present invention may be performed by the wireless charging device 100.

As described above, in any one of cases when a terminal is intended to be charged by a wireless charging device, when a terminal is recognized by a wireless charging device, and when a terminal is in the BLE range of a wireless charging device, a product can be selected through a corresponding terminal on the basis of product information provided from a POS terminal or a service providing device, a function of ordering the selected product can be performed, and a function of paying for the selected product can be performed.

Hereinafter, a method of controlling a wireless charging system according to the present invention will be described hereafter in detail with reference FIGS. 1 to 5.

Figure 5:
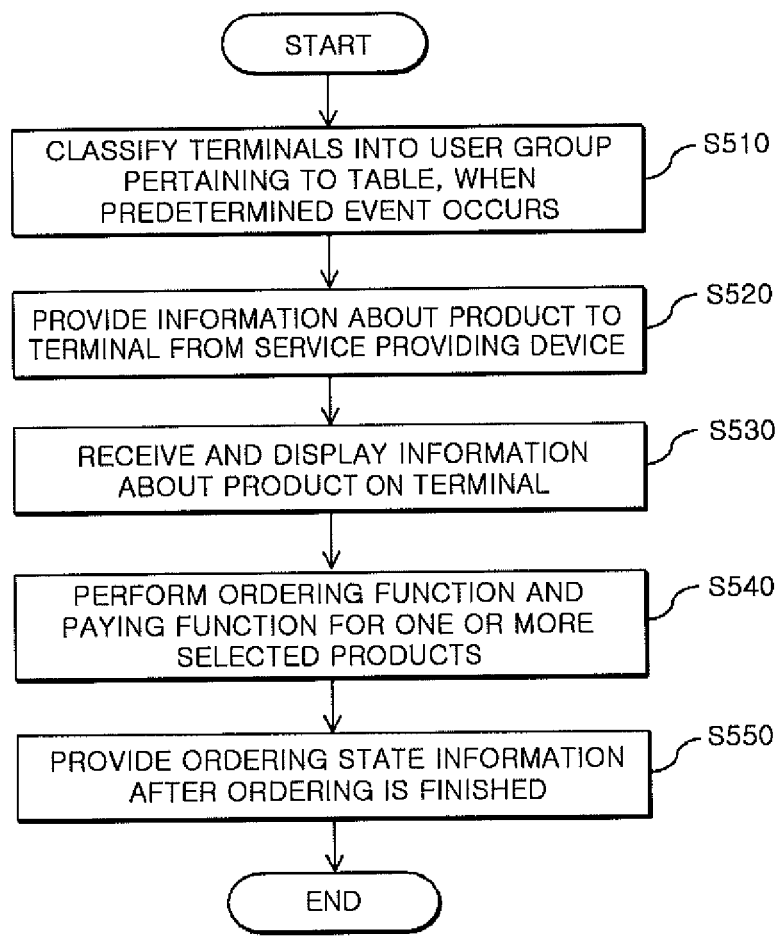
FIG. 5 is a flowchart illustrating a method of controlling a wireless charging system according to an embodiment of the present invention.

FIG. 5 is a flowchart illustrating a method of controlling a wireless charging system according to an embodiment of the present invention.

First, when a predetermined event occurs, the service providing device 300 classifies the terminal in the store, where the wireless charging device 100 is disposed, into a user group pertaining to one table corresponding to the wireless charging device 100. Herein, he predetermined event may be cases when the terminal is charged by the wireless charging device 100, when the terminal 200 is detached from the wireless charging device 100 after being attached to it (or when the terminal 200 communicates with the wireless charging device 100 or when the terminal 200 is recognized by the wireless charging device 100), and when the terminal is in a BLE range of the wireless charging device 100.

That is, when a predetermined even occurs, the service providing device 300 classifies the corresponding terminal 200 in the BLE range of the corresponding wireless charging device 100 into a user group pertaining to one table, on the basis of the information of the corresponding terminal 200 provided from the corresponding wireless charging device 100 and the information of the table where the wireless charging device 100 is positioned.

For example, while the battery 230 in the terminal 200 is charged on the basis of a charging signal transmitted from the wireless charging device 100, the wireless charging device 100 receives the information of the terminal 200 transmitted from the corresponding terminal 200. Further, the wireless charging device 100 provides the information about the corresponding terminal 200, the identification information of the wireless charging device 100, and the information of the table, where the corresponding wireless charging device 100 is positioned, to the service providing device 300. Further, the service providing device 300 classifies the terminal 200 into a user group pertaining to the table corresponding to the table information on the basis of the information of the corresponding terminal 200 and the information of the table where the corresponding wireless charging device 100 is positioned (S510).

Thereafter, the service providing device 300 transmits (or provides) information of products (or menu information) in the store, where the corresponding wireless charging device 100 is disposed, price information of the products, order option information of the products, discount coupon information, different discount rate information according to customer levels, and price discount information relating to promotion at predetermined times to the terminal 200.

For example, the service providing device 300 transmits information of products in the restaurant, where the corresponding wireless charging device 100 is disposed, price information of the products, order option information of the products, discount coupon information, different discount rate information according to customer levels, and price discount information relating to promotion at predetermined times to the terminal 200 (S520).

Thereafter, the terminal 200 receives information of products in the store, where the corresponding wireless charging device 100 is disposed, price information of the products, order option information of the products, discount coupon information, different discount rate information according to customer levels, and price discount information relating to promotion at predetermined times, which are transmitted from the service providing device 300.

Further, the terminal 200 displays the received information of products in the store, price information of the products, order option information of the products, discount coupon information, different discount rate information according to customer levels, and price discount information relating to promotion at predetermined times (S530).

Thereafter, when one or more products in the information displayed on the terminal 200 are selected, the terminal 200 performs a function of ordering and paying for one or more selected products in cooperation of the service providing device 300 and the POS terminal 400. Herein, the ordering function includes selecting a product, a product option, and the number of a product.

In this process, in paying, a paying means and a paying way may be selected (or set) in one or more terminals 200 in the user group including the corresponding terminal 200.

That is, in paying, a paying means (for example, including cash, a credit card, and a reserve/discount card) is selected and a paying way is selected for one or more terminals 200 in the user group. Herein, the paying way may include cases when the corresponding terminal 200 that orders the product pays, when one or more terminals 200 in the user group pay divisionally, when one or more terminals 200 in the user group pay for selected products, respectively, and when a person who will pay is determined by lottery through a game. In this process, the corresponding game may include a ladder game and rock-scissors-paper.

For example, when two oo menus are selected and three □□ menus are selected in the information displayed on the terminal 200, a paying means (for example, including a credit card and a discount card) and a paying way (for example, paid divisionally by a plurality of terminals 200 in the user group) are selected respectively in a first terminal 200 selecting the corresponding menus in a plurality of terminals 200 in the corresponding user group. Thereafter, a function of paying for the selected menus (for example, including two oo menus and three □□ menus) is performed by cooperation of the plurality of terminals 200 in the user group, the service providing device 300, and the POS terminal 400, and the result of performing the function of paying is provided respectively to the terminals 200 in the corresponding user group.

For another example, when three ΔΔ menus are selected and two ◊ ◊ menus are selected in the information displayed on the terminal 200, a paying means (for example, including cash and a reserve card) and a paying way (for example, including paid by one of a plurality of terminals 200 in the user group through rock-scissors-paper) are selected respectively in a first terminal 200 selecting the corresponding menus in a plurality of terminals 200 in the corresponding user group. Thereafter, one specific terminal 200 is selected from the terminals 200 in a user group through rock-scissors-paper, a function of paying for the selected menus (for example, including three ΔΔ menus and two ◊ ◊ menus) is performed by cooperation of the selected specific terminal 200, the service providing device 300, and the POS terminal 400, and the result of performing the function of paying is provided to the corresponding specific terminal 200 (S540).

Thereafter, after the paying is finished, when one or more terminals 200 in the corresponding user group request order state information or when the procedure states of the selected products change, the service providing device 300 transmits the order state information to one or more terminals 200 in corresponding the user group at predetermined intervals. Herein, the order state information includes the information of products (or menus) ordered by one or more terminals 200 in the corresponding user group, the price information of the ordered products, the discount information/coupon use information/reserve information of the ordered products, procedure information of the ordered products (for example, including 'order received', 'in cooking', 'in service', and 'delivery/service completed').

Further, one or more terminals 200 in the corresponding user group receives the order state information about the ordered products transmitted from the service providing device 300 and display the received order state information.

For example, the terminals 200 in the corresponding user group receive respectively the order state information transmitted at predetermined intervals from the service providing device 300 and display the received order state information.

For another example, when the procedure states of the selected products change, the terminals 200 in the corresponding user group receive respectively the order state information transmitted from the service providing device 300 and display respectively the received order state information.

Further, when at least one terminal 200 of one or more terminals 200 in a user group pertaining to one table selects a predetermined moving button and moves to a new table (or selects a new table number), the service providing device 300 can delete the corresponding terminal 200 selecting the corresponding moving button from the user group including the terminal 200, change (or classifies/changes/updates) the corresponding terminal to the new table or another user group, and update the information about the product ordered by the corresponding terminal (or order state information in the new table) to the new table.

For example, when a first terminal 200 in a first user group pertaining to a first table selects a predetermined moving button and moves to a second table, the first terminal 200 provides the information of the new table (for example, including the identification information of the second table, and the like) to the service providing device 300. Further, the service providing device 300 deletes (or excepts) the corresponding first terminal 200 from the first user group on the basis of the information about the new table transmitted from the first terminal 200 and classifies the first terminal 200 into a second user group pertaining to the second table. Further, the service providing device 300 updates the order state information of the second user group by adding the information about the product ordered by the first terminal 200 and provides the updated order state information to one or more terminals 200 in the corresponding second user group (S550).

A method of controlling a service providing device and a terminal, and a wireless charging system including the service providing device and the terminal, according to an embodiment of the present invention, can be recorded in a computer program, and codes and code segments of the computer program can be easily inferred by computer programmers in the field. Further, the corresponding computer program is kept in computer readable media and read and executed by a computer, a wireless charging device according to an embodiment of the present invention, a terminal (or user device) including a PRU, a service providing device, and a POS terminal, such that a service providing device and a terminal, and a wireless charging system including the service providing device and the terminal can be achieved.

The computer readable media include a magnetic recording medium, an optical recording medium, and a carrier wave medium. A computer program for achieving a service providing device and a terminal, and a wireless charging system including the service providing device and the terminal according to an embodiment of the present invention can be stored and installed in a built-in memory of a wireless charging device, a terminal (or user device) including a PRU, a service providing device, and a POS terminal. Alternatively, an external memory such as a smart card, where a computer program for achieving a service providing device and a terminal, and a wireless charging system including the service providing device and the terminal according to an embodiment of the present invention is kept and installed, can be mounted in a wireless charging device, a terminal (or user device) including a PRU, a service providing device, and a POS terminal through an interface.

According to an embodiment of the present invention, as described above, in any one of cases when a terminal is intended to be charged by a wireless charging device, when a terminal is recognized by a wireless charging device, and when a terminal is in the BLE range of a wireless charging device, a product is selected through a corresponding terminal on the basis of product information provided from a POS terminal or a service providing device, a function of ordering the selected product is performed, and a function of paying for the selected product is performed, such that the wireless charging system can be used in more fields and more conveniently used.

Figure 6:
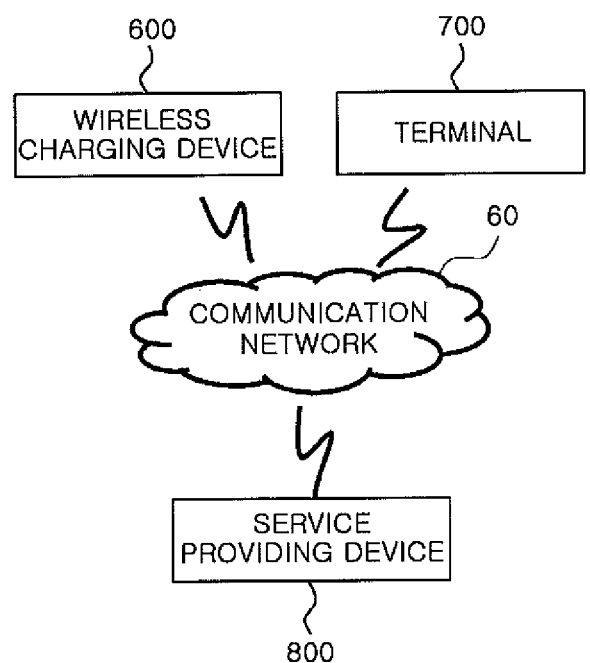
FIG. 6 is a block diagram illustrating the configuration of a wireless charging system according to another embodiment of the present invention.

FIG. 6 is a block diagram illustrating the configuration of a wireless charging system 60 according to another embodiment of the present invention.

As illustrated in FIG. 6, the wireless charging system 60 includes a wireless charging device 600, a terminal 700, and a service providing device 800. The components of the wireless charging system 60 illustrated in FIG. 6 are not all necessary components, and the wireless charging system 60 may be composed of components much or less than the components illustrated in FIG. 6. Herein, the wireless charging device 600 and the terminal 700 are operated by A4WP (Alliance for Wireless Power) (or in magnetic resonance type) and a battery of the corresponding terminal 700 is charged on the basis of a charging signal transmitted from the wireless charging device 600. Further, BLE (Bluetooth Low Energy) is used for the corresponding wireless charging device 600 and the terminal 700.

When a predetermined event, such as cases when the terminal is charged by the wireless charging device 600, when the terminal 700 is detached from the wireless charging device 600 after being attached to it (or when the terminal 700 communicates with the wireless charging device 600 or when the terminal 700 is recognized by the wireless charging device 600), and when the terminal is in a BLE range of the wireless charging device 600, occurs, the wireless charging device 600 classifies the terminal 700 close to the corresponding wireless charging device 600 into the user group pertaining to the table where the corresponding wireless charging device 600 is disposed. Further, the wireless charging device 600 provides (or relays/performs) a function of sharing contents in a plurality of terminals 700 in the corresponding user group.

Figure 7:
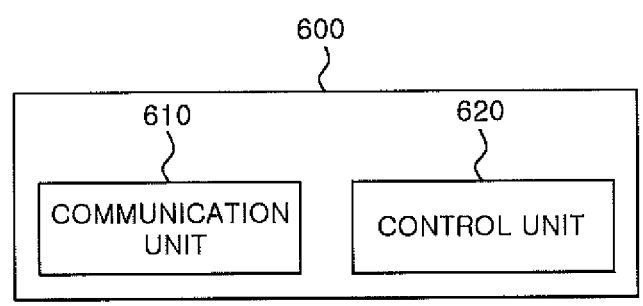
FIG. 7 is a block diagram illustrating the configuration of a wireless charging device according to another embodiment of the present invention.

As illustrated in FIG. 7, the wireless charging device (or wireless charger) (Power Transmitting Unit, PTU) 600 includes a communication unit 610 and a control unit 620. The components of the wireless charging device 600 illustrated in FIG. 7 are not all necessary components, and the wireless charging device 600 may be composed of components much or less than the components illustrated in FIG. 7.

The communication unit 610 communicates with another terminal using a BLE type, using BLE (Bluetooth Low Energy).

Further, the communication unit 610 is controlled by the control unit 620 to transmit a power beacon signal to communicate with another terminal using the BLE type.

The control unit 620 controls the entire function of the wireless charging device 600.

Further, the control unit 620 creates power beacon signal at every predetermined time in wireless charging of A4WP type.

Further, the control unit 620 transmits the created power beacon signals at predetermined intervals through the communication unit 610.

Further, the control unit 620 receives control signal (for example, a PRU advertisement signal), which is transmitted from the terminal 700 receiving a corresponding power beacon signal, through the communication unit 610 in response to the transmitted power beacon signal.

Further, the control unit 620 communicates with the corresponding terminal 700 close to the corresponding wireless charging device 600 on the basis of the received control signal.

Further, the control unit 620 schedules a time for transmitting a charging signal to one or more terminals 700 connected with the corresponding wireless charging device 600, in a time slot (or time sequence/time for which entire data can be transmitted), in order to transmit the corresponding charging signal to one or more terminals 700 connected with the corresponding wireless charging device 600.

Further, the control unit 620 creates a charging signal by controlling an inductor (not illustrated) and a capacitor (not illustrated) included in the wireless charging device 600. In this process, the wireless charging device 600 creates a charging signal for wireless charging in a resonant coupling type.

Further, the control unit 620 transmits a charging signal created on the basis of the scheduled time slot to specific terminals of the terminals 700 connected to the corresponding wireless charging device 600, at predetermined intervals (for example, 250 ms).

In this process, when a plurality of terminals 700 is connected to the corresponding wireless charging device 600, the control unit 620 can create individual charging signals to transmit respectively to the terminals 700 and transmit the charging signals to the corresponding terminals 700, respectively. Further, when a plurality of terminals 700 is connected to the corresponding wireless charging device 600, the control unit 620 can create one charging signal to transmit respectively to the terminals 700 and transmit one created charging signal to the terminals 700.

Further, the control unit 620 may transmit a charging signal to a corresponding terminal 700 on the basis of a control signal (or a charging signal transmission request signal) (for example, including a PRU dynamic parameter) transmitted from the terminal 700.

Further, when a predetermined event, such as cases when the terminal is charged by the wireless charging device 600, when the terminal 700 is detached from the wireless charging device 600 after being attached to it (or when the terminal 700 communicates with the wireless charging device 600 or when the terminal 700 is recognized by the wireless charging device 600), and when the terminal is in a BLE range of the wireless charging device 600, occurs, the control unit 620 receives the information of the terminal 700 transmitted from the corresponding terminal 700 through the communication unit 610. Herein, the information of the terminal 700 includes IMSI (International Mobile Subscriber Identity) of a USIM in the terminal 700 and unique IMEI (International Mobile Equipment Identity) of the terminal 700. In this process, the IMSI includes an MCC (Mobile Country Code), an MNC (Mobile Network Code), MSI (Mobile Subscriber Identity), and an MSIN (Mobile Subscriber Identifier Number). Further, the IMEI includes the unique serial number of a terminal, the manufacturer of a terminal, and model information.

Further, the control unit 620 classifies a terminal 700 that is close to the corresponding wireless charging device 600 (or that is being charged through the corresponding wireless charging device 600 existing in/corresponding to the BLE range of the corresponding wireless charging device 600) into the user group pertaining to one table corresponding to the wireless charging device 600.

That is, when a predetermined even occurs, the control unit 620 classifies the corresponding terminal in the BLE range of the corresponding wireless charging device 600 into the user group pertaining to one table on the basis of the information of the table, where the wireless charging device is positioned, and the received information about the terminal 700.

Further, the control unit 620 creates a sharing inquiry signal. Herein, the sharing inquiry signal may be a signal that asks whether to mutually share contents kept in a plurality of terminals 700, which is included in the user group pertaining to the table where the corresponding wireless charging device 600 is positioned (or a user group corresponding to the wireless charging device), or whether to mutually share contents provided from the wireless charging device 600 (or the service providing device). When the terminal 700 is charged through the wireless charging device 600, when a terminal is in the BLE range of the wireless charging device 600, or when a terminal is connected at first time to the wireless charging device 600, the control unit 620 may create a corresponding sharing inquiry signal.

Further, the control unit 620 transmits respectively the created sharing inquiry signal to one or more (or a plurality of) terminals 700 in the corresponding user group through the communication unit 610.

Further, the control unit 620 receives a response signal transmitted from the terminal 700 through the communication unit 610 in response to the transmitted sharing inquiry signal.

Further, the control unit 620 performs the corresponding function included in the response signal on the basis of the received response signal.

That is, when information including disagreement to contents sharing is included in a response signal, the control unit 620 does not share (provide) the contents provided to the corresponding user group corresponding to the terminal 700 on the basis of the information including disagreement to corresponding contents sharing, and provides a charging signal for charging the battery 730 at predetermined intervals corresponding to the terminal 700 through the communication unit 610.

Further, when information saying agreement contents sharing, sharing object information, sharing time information, and sharing item information are included in a response signal, the control unit 620 provides (or relays/performs) a function of sharing the contents corresponding to the sharing item information to at least one terminal 700 included in the corresponding user group on the basis of the sharing object information, the sharing time information, and the sharing item information. Herein, the corresponding contents include image, audio, video, moving image, game, and map information provided from a map providing program. In this process, the corresponding contents may be contents kept in terminals 700 or contents provided from the service providing device 800.

Further, the control unit 620 creates sharing state information. Herein, the sharing state information includes the information about a user group corresponding to the wireless charging device 600, the information about the terminals included in the corresponding user group, identification information of the wireless charging device 600, the information about sharing objects of the terminals, the information about sharing time of the terminals, the information about sharing items of the terminals, and conversation. In this process, the conversation includes messages transmitted/received among a plurality of terminals 700 in the same user group.

Further, the control unit 620 transmits the created sharing state information to the service providing device 800 through the communication unit 610.

Further, the control unit 620 receives additional service information for terminals which is transmitted from the service providing device 800, through the communication unit 610. Herein, the additional service information includes, in consideration of features of terminals, various items of contents curation such as promotion information, coupon information, marketing information, product review information, news information, and music information of the store where a corresponding wireless charging device 600 is disposed.

Further, the control unit 620 provides the received additional service information for terminals to corresponding terminals 700.

Further, when a function of purchasing (or paying for) a specific product included in the additional service information is requested to a terminal 700, the control unit 620 may perform the function of purchasing the corresponding product by cooperation of the terminal 700, the service providing device 800, and a POS terminal (not illustrated).

Further, even though the battery 730 finishes (or stops) being charged by cooperation of the wireless charging device 600 and the terminal 700 (or when the corresponding terminal 700 is not in contact with the wireless charging device 600), the function of sharing contents can be continuously performed by cooperation of the wireless charging device 600 and the terminal 700, as long as the terminal 700 is within the service radius of the wireless charging device 600 (or as long as the terminal is in the store where the wireless charging device 600 is disposed).

Figure 8:
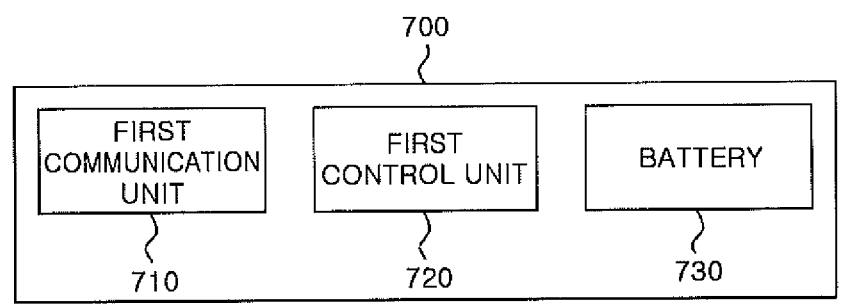
FIG. 8 is a block diagram illustrating the configuration of a terminal according to another embodiment of the present invention.

As illustrated in FIG. 8, the terminal 700 includes a first communication unit 710, a first control unit 720, and a battery 730. The components of the terminal 700 illustrated in FIG. 8 are not all necessary components, and the terminal 700 may be composed of components much or less than the components illustrated in FIG. 8. Herein, the terminal 700 includes a PRU (Power Receiving Unit) (not illustrated).

The first communication unit 710 communicates with other terminals, which uses a BLE type, using BLE.

Further, the first communication unit 710 receives a power beacon signal transmitted from the wireless charging device 600.

The first control unit 720 controls the entire function of the terminal 700.

Further, the first control unit 720 transmits a control signal (for example, a PRU advertisement signal) to the wireless charging device 600 through the first communication unit 710 in order to request connection (or communication) of the corresponding wireless charging device 600 on the basis of the power beacon signal transmitted from the wireless charging device 600, in wireless charging of an A4WP type.

Further, the first control unit 720 connects (communicates) with the wireless charging device 600 on the basis of the transmitted control signal.

Further, the first control unit 720 transmits a control signal (or a charging signal transmission request signal) (for example, including a PRU dynamic parameter) to the wireless charging device 600 at predetermined intervals.

Further, the first control unit 720 controls the terminal to receive charging signals transmitted at predetermined intervals from the wireless charging device 600 through the first communication unit 710. In this process, the first control unit 720 may control the terminal to receive a charging signal from the wireless charging device 600 through the first communication unit 710 in response to the previous control signal (for example, including a PRU dynamic parameter).

Further, the first control unit 720 charges the battery 730 on the basis of a received charging signal. In this process, the terminal 700 may further include additional components for charging the corresponding battery 730 in the resonant coupling type with the wireless charging device 600.

Further, when a predetermined event occurs, the first control unit 720 transmits the information of the terminal 700 to the wireless charging device 600 (or the service providing device 800) through the first communication unit 710. Herein, the information of the terminal 700 includes the IMSI of a USIM in the terminal and the unique IMEI of the terminal 700. In this case, the predetermined event may be cases when the terminal is charged by the wireless charging device 600, when the terminal 700 is detached from the wireless charging device 600 after being attached to it (or when the terminal 700 communicates with the wireless charging device 600 or when the terminal 700 is recognized by the wireless charging device 600), and when the terminal is in a BLE range of the wireless charging device 600.

Further, the first control unit 720 receives a sharing inquiry signal from the wireless charging device 600 through the first communication unit 710 for an idle period (or a waiting period) in which a charging signal is not transmitted/received to/from the wireless charging device 600. In this process, when the terminal 700 is charged through the wireless charging device 600, when a terminal is in the BLE range of the wireless charging device 600, or when a terminal is connected at first time to the wireless charging device 600, the control unit 720 may receive the corresponding sharing inquiry signal created and transmitted by the wireless charging device 600 through the first communication unit 710.

Further, the first control unit 720 creates a response signal on the basis of the received sharing inquiry signal. Herein, the response signal includes information saying whether to agree to sharing contents with other terminals in the user group of the corresponding terminal 700 (for example, including agreement to contents sharing and disagreement to contents sharing). In this process, when information saying agreement to contents sharing is included in the corresponding response signal, the corresponding response signal may further include not only the information saying agreement to contents sharing, but sharing object information (for example, information about selecting at least one another terminal of a plurality of terminals in a user group), sharing time information (for example, including one hour and two hours), sharing item information (for example, including image, audio, video, moving image, game, and map image provided from a map providing program), and the like.

Further, the first control unit 720 transmits a response signal created in response to the received sharing inquiry signal to the wireless charging device 600 through the first communication unit 710.

Further, the first control unit 720 receives additional service information transmitted from the wireless charging device 600 or the service providing device 800 through the first communication unit 710. Herein, the additional service information includes various items of contents curation such as promotion information, coupon information, marketing information, product review information, news information, and music information of the store where a corresponding wireless charging device 600 is disposed.

Further, the first control unit 720 displays the received additional service information on the display unit (not illustrated).

Further, when specific product information (or specific commodity information) is selected from the additional service information displayed on the display unit, the first control unit 720 may perform a function of purchasing a corresponding product by cooperation of the wireless charging device 600, the service providing device 800, and the POS terminal.

Further, the first control unit 720 receives the result of purchasing the product corresponding to the specific product information, which is provided from the POS terminal or the service providing device 800 through the wireless charging device 600, through the first communication unit 710 and displays the received result of purchasing the product through the display unit.

The battery 730 supplies power to the terminal 700.

Further, the battery 730 is charged on the basis of a charging signal transmitted from the wireless charging device 600 controlled by the first control unit 720.

The service providing device 800 receives sharing state information transmitted from the wireless charging device 600. Herein, the sharing state information includes the information about a user group corresponding to the wireless charging device 600, the information about one or more terminals included in the corresponding user group, identification information of the wireless charging device 600, the information about sharing objects of the terminals, the information about sharing time of the terminals, the information about sharing items of the terminals, and conversation.

Further, the service providing device 800 keeps the received sharing state information in big data for providing additional services. In this process, the sharing state information kept in the service providing device 800 may be used as big data for providing additional services to the terminals, when the corresponding terminal 700 visit again the same store or visits another store relating to the corresponding store (for example, another chain store).

Further, the service providing device 800 creates additional service information for each terminal on the basis of the received sharing state information.

Further, the service providing device 800 transmits the created additional service information to corresponding terminals 700 through the wireless charging device 600. Herein, the additional service information includes various items of contents curation such as promotion information, coupon information, marketing information, product review information, news information, and music information of the store where a corresponding wireless charging device 600 is disposed.

Further, when a function of purchasing (or paying for) a specific product included in the additional service information is requested to a terminal 700, the service providing device 800 may perform the function of purchasing the corresponding product by cooperation of the wireless charging device 600, the terminal 700, and the POS terminal.

In this description of the present invention, when contents are shared among a plurality of (or one or more) terminals 700 in a user group pertaining to a table including the wireless charging device 600, the wireless charging device 600 performs the function of sharing the corresponding contents, but the present invention is not limited thereto and it may be performed by the service providing device 800.

The POS (Point Of Sale) terminal (not illustrated) performs a function of paying for a product selected by the terminal 700 in cooperation with the wireless charging device 600, the terminal 700, and the service providing device 800.

Further, the POS terminal provides the result of paying to the terminal 700 or the service providing device 800.

As described above, in any one of cases when a terminal is charged by a wireless charging device, when a terminal is detached from a wireless charging device after being attached to it, and when a terminal is in the BLE range of a wireless charging device, the terminal is classified into a user group in one table and contents can be shared between one or more terminals in the corresponding user group.

A method of controlling a wireless charging system according to the present invention will be described hereafter in detail with reference FIGS. 6 to 9.

Figure 9:
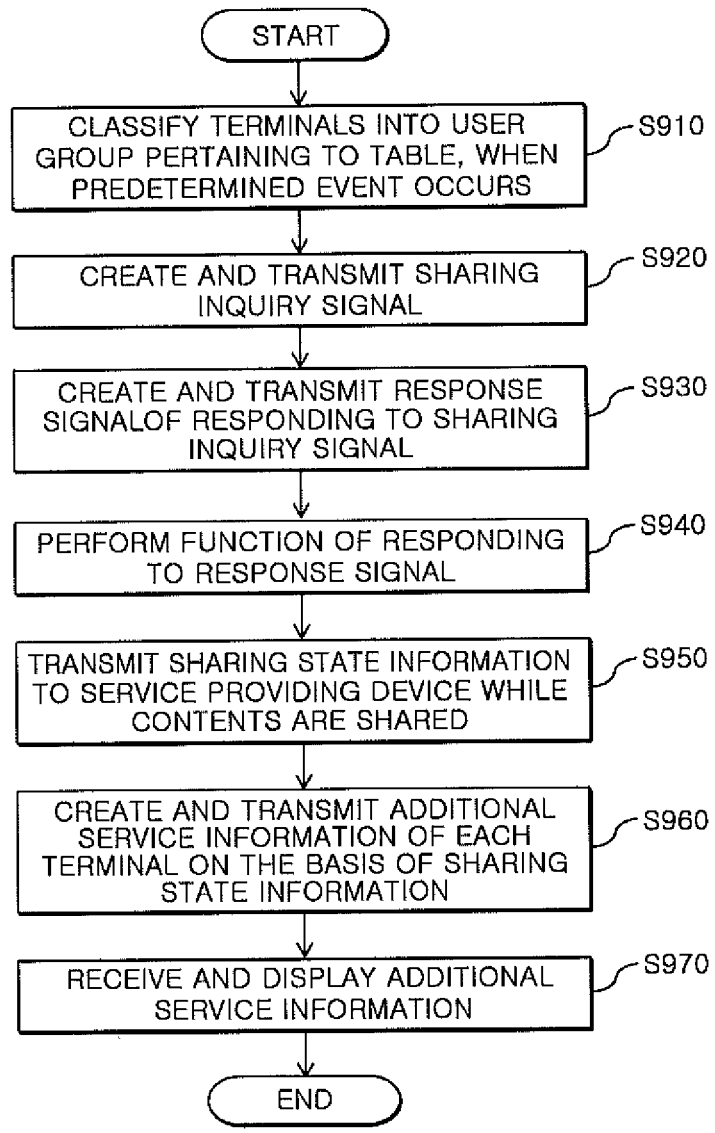
FIG. 9 is a flowchart illustrating a method of controlling a wireless charging system according to another embodiment of the present invention.

FIG. 9 is a flowchart illustrating a method of controlling a wireless charging system according to an embodiment of the present invention.

First, when a predetermined event occurs, the wireless charging device 600 classifies a terminal 700 that is close to the corresponding wireless charging device 600 (or that is being charged through the corresponding wireless charging device 600 existing in/corresponding to the BLE range of the wireless charging device 600) into the user group pertaining to one table corresponding to the wireless charging device 600. Herein, the predetermined event may be cases when the terminal is charged by the wireless charging device 600, when the terminal 700 is detached from the wireless charging device 600 after being attached to it (or when the terminal 700 communicates with the wireless charging device 600 or when the terminal 700 is recognized by the wireless charging device 600), when the terminal is in a BLE range of the wireless charging device 600, and the like.

That is, when a predetermined event occurs, the wireless charging device 600 classifies the corresponding terminal 700 in the BLE range of the wireless charging device 600 into the user group of one table on the basis of the information about the table where the corresponding wireless charging device 600 is positioned and the information of the corresponding terminal 700 provided from the terminal 700 close to the corresponding wireless charging device 600.

For example, while the battery 730 in the terminal 700 is charged on the basis of a charging signal transmitted from the wireless charging device 600, the wireless charging device 600 receives the information of the terminal 700 transmitted from the corresponding terminal 700. Further, the wireless charging device 600 classifies the corresponding terminal 700 into a first user group pertaining to a first table corresponding to the table information on the basis of the information of the corresponding terminal 700 and the information of the table where the corresponding wireless charging device 600 is positioned (S910).

Thereafter, the wireless charging device 600 creates a sharing inquiry signal. Herein, the sharing inquiry signal may be a signal that asks whether to mutually share contents kept in a plurality of terminals 700, which is included in the user group (or the user group corresponding to the wireless charging device 600) pertaining to the table where the corresponding wireless charging device 600 is positioned, among the terminals 700 or whether to mutually share contents provided from the wireless charging device 600 (or the service providing device).

Further, the wireless charging device 600 transmits respectively the created sharing inquiry signal to one or more (or a plurality of) terminals 700 in the corresponding user group.

For example, the wireless charging device 600 creates a sharing inquiry signal for asking whether to share contents among a plurality of terminals 700 in the first user group corresponding to the first table including the corresponding wireless charging device 600 and transmits respectively the created sharing inquiry signal to the terminals 700 in the corresponding first user group (S920).

Thereafter, the terminals 700 receive the sharing inquiry signal transmitted from the wireless charging device 600.

Further, the terminals 700 create a response signal on the basis of the received sharing inquiry signal. Herein, the response signal includes information saying whether to agree to sharing contents with other terminals in the user group of the corresponding terminal 700 (for example, including agreement to contents sharing and disagreement to contents sharing). In this process, when information saying agreement to contents sharing is included in the corresponding response signal, the corresponding response signal may further include not only the information saying agreement to contents sharing, but sharing object information (for example, information about selecting at least one another terminal of a plurality of terminals in a user group), sharing time information (for example, including one hour and two hours), sharing item information (for example, including image, audio, video, moving image, game, and map image provided from a map providing program), and the like.

Further, the terminal 700 transmits the created response signal to the wireless charging device 600.

For example, the terminals 700 create a response signal including disagreement to content sharing. Further, the terminal 700 transmits the response signal created in response to the received sharing inquiry signal to the wireless charging device 600.

For another example, the terminal 700 creates a response signal including information saying agreement to contents sharing, sharing object information (for example, including all terminals in the first user group), sharing time information (for example, including one hour), and sharing item information (for example, including a moving image). Further, the terminal 700 transmits the response signal created in response to the received sharing inquiry signal to the wireless charging device 600 (S930).

Thereafter, the wireless charging device 600 receives a response signal transmitted from the terminal 700 in response to the transmitted sharing inquiry signal.

Further, the wireless charging device 600 performs the corresponding function included in the response signal on the basis of the received response signal.

That is, when information including disagreement of contents sharing is included in a response signal, the wireless charging device 600 does not share (provide) the contents provided to the corresponding user group corresponding to the terminal 700 on the basis of the information including disagreement of corresponding contents sharing, and provides a charging signal for charging the battery 730 at predetermined intervals to the corresponding terminal 700.

Further, when information saying agreement of contents sharing, sharing object information, sharing time information, sharing item information, and the like, are included in a response signal, the wireless charging device 600 provides (or relays/performs) a function of sharing the contents corresponding to the corresponding sharing item information to at least one terminal 700 included in the corresponding user group on the basis of the sharing object information, the sharing time information, the sharing item information, and the like. Herein, the corresponding contents include image, audio, video, moving image, game, and map information provided from a map providing program. In this process, the corresponding contents may be contents kept in terminals 700 or contents provided from the service providing device 800.

For example, when the wireless charging device 600 receives information saying agreement to contents sharing, sharing object information (for example, including all terminals in the first user group), sharing time information (for example, including one hour), and sharing item information (for example, including a moving image), which are transmitted from the terminal 700, it provides a function of sharing mutually moving images provided from one or more of a plurality of terminals 700 in the corresponding user group to all terminals 700 in the corresponding user group including the terminal 700. In this process, moving images can be shared between the terminals 700 via (or through) the wireless charging device 600. Further, a specific terminal of the terminals 700 may accept or reject reception of a shared moving image from a corresponding terminal 700.

For another example, when the wireless charging device 600 receives information saying agreement to contents sharing, sharing object information (for example, including all terminals in the first user group), sharing time information (for example, including one hour), and sharing item information (for example, including a rock-scissors-paper), which are transmitted from the terminal 700, it proceeds (or performs) rock-scissors-paper with all terminals 700 in the corresponding user group including the terminal 700. In this process, rock-scissors-paper between all terminals 700 in the corresponding user group may be performed by the service providing device 800 (S940).

Thereafter, the wireless charging device 600 transmits sharing state information to the service providing device 800. Herein, the sharing state information includes the information about a user group corresponding to the wireless charging device 600, the information about one or more terminals included in the corresponding user group, identification information of the wireless charging device 600, the information about sharing objects of the terminals, the information about sharing time of the terminals, the information about sharing items of the terminals, and conversation.

For example, while contents are shared, the wireless charging device 600 creates sharing state information at predetermined intervals or in response to a sharing state information transmission request from the service providing device 800 and transmits the created sharing state information to the service providing device 800 (S950).

Thereafter, the service providing device 800 receives sharing state information from the wireless charging device 600.

Further, the service providing device 800 keeps the received sharing state information in big data for providing additional services. In this process, the sharing state information kept in the service providing device 800 may be used as big data for providing additional services to the corresponding terminals 700, when the corresponding terminal 700 visit again the same store or visits another store relating to the corresponding store (for example, another chain store).

Further, the service providing device 800 creates additional service information for each terminal on the basis of the received sharing state information and transmits the created additional service information to corresponding terminals 700 through the wireless charging device 600. Herein, the additional service information includes various items of contents curation such as promotion information, coupon information, marketing information, product review information, news information, and music information of the store where a corresponding wireless charging device 600 is disposed (S960).

Thereafter, the terminals 700 receive the additional service information created in accordance with features of the corresponding terminals 700 and transmitted from the service providing device 800.

Further, the terminals 700 display the received additional service information (S970).

A method of controlling a wireless charging device and a terminal, and a wireless charging system including the wireless charging device and the terminal, according to an embodiment of the present invention, can be recorded in a computer program, and codes and code segments of the computer program can be easily inferred by computer programmers in the field. Further, the corresponding computer program is kept in computer readable media and read and executed by a computer, a wireless charging device according to an embodiment of the present invention, a terminal (or user device) including a PRU, a service providing device, and a POS terminal, such that a wireless charging device and a terminal, and a wireless charging system including the wireless charging device and the terminal can be achieved.

The computer readable media include a magnetic recording medium, an optical recording medium, and a carrier wave medium. A computer program for achieving a wireless charging device and a terminal, and a wireless charging system including the wireless charging device and the terminal according to an embodiment of the present invention can be stored and installed in a built-in memory of a wireless charging device, a terminal (or user device) including a PRU, a service providing device, and a POS terminal. Alternatively, an external memory such as a smart card, where a computer program for achieving a wireless charging device and a terminal, and a wireless charging system including the wireless charging device and the terminal according to an embodiment of the present invention is kept and installed, can be mounted in a wireless charging device, a terminal (or user device) including a PRU, a service providing device, and a POS terminal through an interface.

As described above, in any one of cases when a terminal is charged by a wireless charging device, when a terminal is detached from a wireless charging device after being attached to it, and when a terminal is in the BLE range of a wireless charging device, the terminal is classified into a user group in one table and contents are shared between one or more terminals in the corresponding user group, so the wireless charging system can be used in more fields and more conveniently used.

Figure 10:
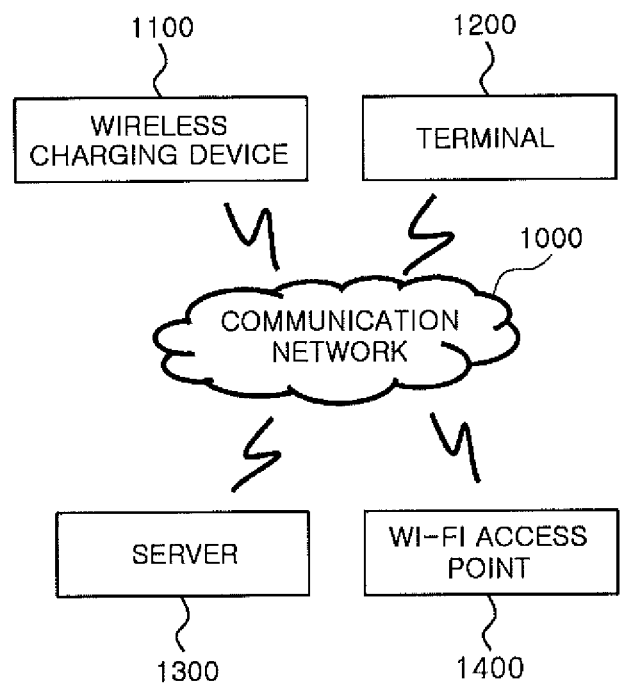
FIG. 10 is a block diagram illustrating the configuration of a wireless charging system according to an embodiment of the present invention.

FIG. 10 is a block diagram illustrating the configuration of a wireless charging system 1000 according to another embodiment of the present invention.

As illustrated in FIG. 10, the wireless charging system 1000 includes a wireless charging device 1100, a terminal 1200, a server 1300, and a Wi-Fi access point 1400. The components of the wireless charging system 1000 illustrated in FIG. 10 are not all necessary components, and the wireless charging system 1000 may be composed of components much or less than the components illustrated in FIG. 10. Herein, the wireless charging device 1100 and the terminal 1200 are operated by A4WP (Alliance for Wireless Power) (or in magnetic resonance type) and a battery of the corresponding terminal 1200 is charged on the basis of a charging signal transmitted from the wireless charging device 1100. Further, BLE (Bluetooth Low Energy) is used for the wireless charging device 1100 and the terminal 1200.

When the terminal 1200 enters a store where the wireless charging device 1100 and the Wi-Fi access point 1400 are disposed, the server 1300 creates a first control signal for adjusting (or controlling) the wireless charging intensity of the wireless charging device 1100 and a second control signal for adjusting (or controlling) the Wi-Fi transmission intensity of the Wi-Fi access point 1400 in accordance with a movement path of the corresponding terminal 1200 (or whether the terminal 1200 has moved in a predetermined order of section information), whether one or more products set in advance in each section has been touched (or tagged), and whether predetermined products have been touched for a predetermined time or more, and transmits the created first control signal and second control signal to the wireless charging device 1100 and the Wi-Fi access point 1400, respectively. Thereafter, the wireless charging device 1100 adjusts (or controls) the wireless charging intensity (or wireless charging sensitivity) for the terminal 1200 on the basis of the first control signal. Further, the Wi-Fi access point 1400 adjusts the Wi-Fi transmission intensity for the terminal 1200 on the basis of the second control signal.

Figure 11:
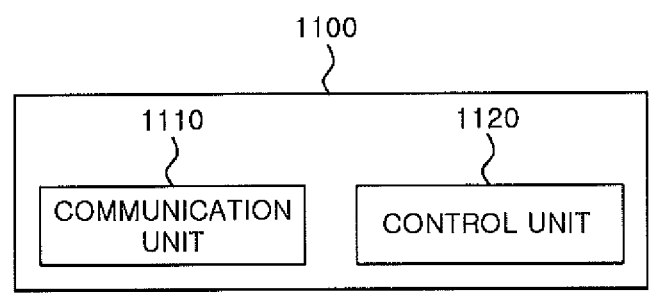
FIG. 11 is a block diagram illustrating the configuration of a wireless charging device according to an embodiment of the present invention.

As illustrated in FIG. 11, the wireless charging device (or wireless charger) (Power Transmitting Unit, PTU) 1100 includes a communication unit 1110 and a control unit 1120. The components of the wireless charging device 1100 illustrated in FIG. 11 are not all necessary components, and the wireless charging device 1100 may be composed of components much or less than the components illustrated in FIG. 11.

The communication unit 1110 communicates with another terminal using a BLE type, using BLE (Bluetooth Low Energy).

Further, the communication unit 1110 is controlled by the control unit 1120 to transmit a power beacon signal to communicate with another terminal using the BLE type.

The control unit 1120 controls the entire function of the wireless charging device 1100.

Further, the control unit 1120 creates power beacon signal at every predetermined time in wireless charging of A4WP type.

Further, the control unit 1120 transmits the created power beacon signals at predetermined intervals through the communication unit 1110.

Further, the control unit 1120 receives control signal (for example, a PRU advertisement signal), which is transmitted from the terminal 1200 receiving a power beacon signal, through the communication unit 1100 in response to the power beacon signal.

Further, the control unit 1120 communicates with the corresponding terminal 1200 close to the corresponding wireless charging device 1100 on the basis of the received control signal.

Further, the control unit 1120 may transmit a charging signal to a corresponding terminal 1200 on the basis of a control signal (or a charging signal transmission request signal) (for example, including a PRU dynamic parameter) transmitted from the terminal 1200.

Further, the control unit 1120 transmits a corresponding power beacon signal through the communication unit 1110 only in the store (or area/section) where the wireless charging device 1100 is disposed, and does not transmit a power beacon signal to a terminal that is within the radius to which a signal from the wireless charging device 1100 is transmitted, but is not in the store.

That is, the control unit 1120 checks whether the terminal 1200 enters the stores where the corresponding wireless charging device 1100 is disposed, and transmits a power beacon signal only to the terminal 1200 entering the corresponding store. Herein, the control unit 1120 finds out (or determines/checks) whether the terminal enters a store, through a change in Wi-Fi signal intensity, a change in beacon signal (or BLE beacon signal) intensity, and a change in signal intensity of a PTU in the wireless charging device 1100.

Further, the control unit 1120 may check (or find out) information about a movement path of the terminal 1200 (or whether the terminal 1200 has moved in a predetermined order of section information), whether one or more products set in advance in each section has been touched (tagged), and whether the terminal 1200 has touched predetermined products for a predetermined time or more, and may transmit the corresponding information to the server 1300 through the communication unit 1110.

Further, the control unit 1120 receives the first control signal for adjusting the wireless charging intensity of the wireless charging device 1100, which is transmitted from the server 1300, through the communication unit 1110. Herein, the first control signal includes wireless charging intensity and identification information of the terminal 1200.

Further, the control unit 1120 provides a wireless charging function to the corresponding terminal 1200 with the wireless charging intensity corresponding to the first control signal on the basis of the received first control signal.

Figure 12:
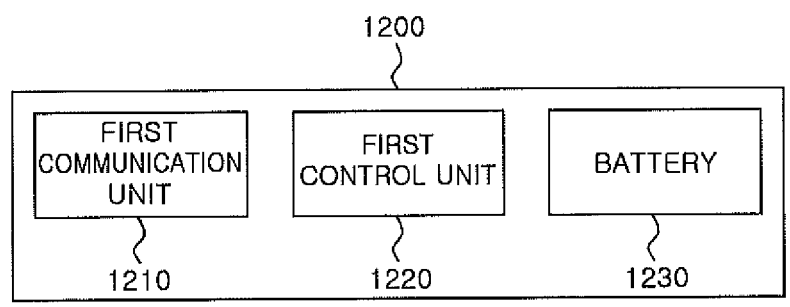
FIG. 12 is a block diagram illustrating the configuration of a terminal according to an embodiment of the present invention.

As illustrated in FIG. 12, the terminal 1200 includes a first communication unit 1210, a first control unit 1220, and a battery 1230. The components of the terminal 1200 illustrated in FIG. 12 are not all necessary components, and the terminal 1200 may be composed of components much or less than the components illustrated in FIG. 12. The terminal 1200 includes a PRU (Power Receiving Unit) (not illustrated).

The first communication unit 1210 communicates with other terminals, which uses a BLE type, using BLE.

Further, the first communication unit 1210 receives a power beacon signal transmitted from the wireless charging device 1100.

The first control unit 1220 controls the entire function of the terminal 1200.

Further, the first control unit 1220 transmits a control signal (for example, a PRU advertisement signal) to the wireless charging device 1100 through the first communication unit 1210 in order to request connection (or communication) of the corresponding wireless charging device 1100 on the basis of the power beacon signal transmitted from the wireless charging device 1100, in wireless charging of an A4WP type.

Further, the first control unit 1220 connects (communicates) with the corresponding wireless charging device 1100 on the basis of the transmitted control signal.

Further, the first control unit 1220 transmits a control signal (or a charging signal transmission request signal) (for example, including a PRU dynamic parameter) to the wireless charging device 1100 at predetermined intervals.

Further, the first control unit 1220 controls the terminal to receive charging signals transmitted at predetermined intervals from the wireless charging device 1100 through the first communication unit 1210. In this process, the first control unit 1220 may control the terminal to receive a charging signal transmitted from the wireless charging device 1100 through the first communication unit 1210 in response to the previous control signal (for example, including a PRU dynamic parameter).

Further, the first control unit 1220 charges the battery 1230 on the basis of a received charging signal. In this process, the terminal 1200 may further include additional components for charging the corresponding battery 1230 in the resonant coupling type with the wireless charging device 1100.

Further, the first control unit 1220 sequentially moves to a plurality of sections set in advance in a store and touches (or tags) products in the sections. Herein, the product contact may include not only tagging, but recognizing (or sensing) actions of a user of the terminal 1200, such as touching a product, checking a price tag, and reading a description.

Further, when a specific product in a specific section is touched, the first control unit 1220 creates estimation information (or a response signal) including information about the touched specific product (for contact product information), contact time (or product contact time), information about the corresponding section (or information about the section where the product is disposed), and identification information of the terminal 1200.

Further, the first control unit 1220 transmits the created estimation information to the server 1300 through the first communication unit 1210. In this process, the identification information of the terminal 1200 includes the MDN (Mobile Directory Number), the mobile IP, the mobile MAC, the specific information of a Sim (subscriber identity module) card, and the serial number of the terminal 1200.

When a specific product in a specific section is touched, as described above, the first control unit 1220 transmits corresponding estimation information to the server 1300 through the first communication unit 1210. Further, the first control unit 1220 creates a plurality of items of estimation information about a plurality of products in a plurality of sections to which it sequentially moves, and may transmit the created estimation information to the server 1300 through the first communication unit 1210.

Further, the first control unit 1220 may transmit corresponding estimation information to the server 1300 via the wireless charging device 1100 through the first communication unit 1210.

Further, the first control unit 1220 receives a wireless charging function and a Wi-Fi function respectively provided from the wireless charging device 1100 and the Wi-Fi access point 1400 on the basis of a first control signal for adjusting the wireless charging intensity created by the server 1300 and a second control signal for adjusting the Wi-Fi transmission intensity in accordance with a movement path of the terminal 1200, whether one or more products set in advance in each section has been touched (or tagged), and whether the terminal 1200 has touched predetermined products for a predetermined time or more.

That is, the first control unit 1220 charges the battery 1230 at the corresponding wireless charging intensity provided from the wireless charging device 1100 on the basis of the first control signal for adjusting the wireless charging intensity created by the server 1300.

Further, the first control unit 1220 performs a wireless communication (or Wi-Fi) function through the first communication unit 1210 at the corresponding Wi-Fi transmission intensity provided from the Wi-Fi access point 1400 on the basis of the second control signal for adjusting the Wi-Fi transmission intensity created by the server 1300.

The battery 1230 supplies power to the corresponding terminal 1200.

Further, the battery 1230 is charged on the basis of a charging signal transmitted from the wireless charging device 1100 controlled by the first control unit 1220.

Figure 13:
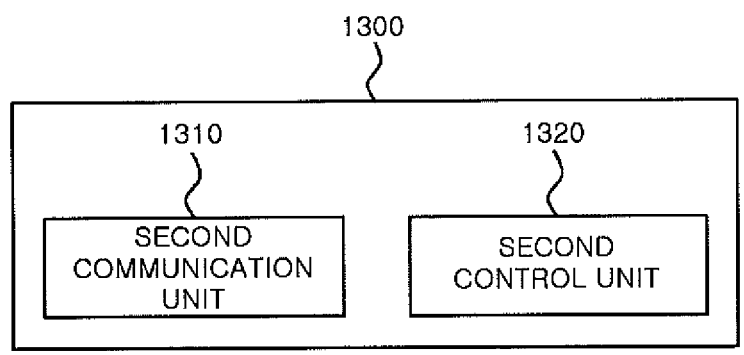
FIG. 13 is a block diagram illustrating the configuration of a server according to an embodiment of the present invention.

As illustrated in FIG. 13, the server 1300 includes a second communication unit 1310 and a second control unit 1320. The components of the server 1300 illustrated in FIG. 13 are not all necessary components, and the server 1300 may be composed of components much or less than the components illustrated in FIG. 13. Herein, the server 1300 may be configured in the type of an individual server system in a store and may be configured in the type of a center-integrate cloud system.

The second communication unit 1310 communicates with other terminals, which uses a BLE type, using BLE.

Further, the second communication unit 1310 may communicate with other terminals in other types of communication.

The second control unit 1320 controls the entire function of the server 1300.

Further, the second control unit 1320 receives estimation information transmitted from a terminal 1200 positioned in a store where the terminal 1200 or the wireless charging device 1100 is positioned, through the second communication unit 1310. Herein, the estimation information includes information about a product that the terminal 1200 has touched (or contact product information), contact time, section information (or information about the section including a touched contact), and identification information of the terminal 1200.

Further, the second control unit 1320 analyzes the received estimation information and provides a service function to a plurality of terminal including the corresponding terminal 1200 by applying the analysis result to marketing information.

Further, the second control unit 1320 calculates a terminal point on the basis of at least one of information about a product, contact time, and section information included in a plurality of (or one or more) estimation information received in relation to the corresponding terminal 1200.

As described above, the second control unit 1320 calculates a terminal point on the basis of whether the terminal 1200 has moved in a predetermined order of section information, whether the terminal 1200 has touched one or more predetermined products in each section, whether the terminal 1200 has touched predetermined products for a predetermined time or more, and the like.

Further, the second control unit 1320 finds out wireless charging intensity (or wireless charging sensitivity) corresponding to the calculated terminal point in wireless charging intensity at predetermined terminal points.

Further, the second control unit 1320 creates a first control signal including the found-out wireless charging intensity and identification information of the terminal 1200.

Further, the second control unit 1320 transmits a first control signal for adjusting the created wireless charging intensity of the wireless charging device 1100 to the wireless charging device 1100 through the second communication unit 1310.

Further, the second control unit 1320 finds out Wi-Fi transmission intensity corresponding to the calculated terminal point in Wi-Fi transmission intensity at predetermined terminal points.

Further, the second control unit 1320 creates a second control signal including the found-out Wi-Fi transmission intensity and identification information of the terminal 1200.

Further, the second control unit 1320 transmits a second control signal for adjusting the created Wi-Fi transmission intensity of the Wi-Fi access point 1400 to the Wi-Fi access point 1400 through the second communication unit 1310.

In this process, the second control unit 1320, instead of separately creating the first signal and the second signal, may create one beacon signal including the wireless charging intensity (or wireless charging sensitivity) found out from the wireless charging intensity at predetermined terminal points, the Wi-Fi transmission intensity found out in response to the terminal point from the Wi-Fi transmission intensity at predetermined terminal points, and information for BLE control, and the identification information of the terminal 1200. Herein, the beacon signal may be a signal including user's intention for beacon control relating to arrangement of products in a store.

Further, the second control unit 1320 transmits respectively the created beacon signal to the wireless charging device 1100 and the Wi-Fi access point 1400 through the second communication unit 1310.

Further, the second control unit 1320 provides a predetermined coupon to the corresponding terminal 1200 on the basis of the calculated terminal point.

That is, when the calculated terminal point is a predetermined point or more, the second control unit 1320 provides a coupon to the corresponding terminal 1200 through the second communication unit 131.

Further, the second control unit 1320 stores the identification information of the terminal 1200, which is transmitted from the wireless charging device 1100 or the terminal 1200, through a storage unit (not illustrated). Herein, the identification information of the terminal may further include customer information of the user of the terminal 1200 (or user information) and member information, in addition to the MDN (Mobile Directory Number), the mobile IP, the mobile MAC, the specific information of a Sim (subscriber identity module) card, and the serial number of the terminal 1200, which were described above.

Further, the second control unit 1320 stores identification information of the wireless charging device 1100, which is transmitted from the wireless charging device 1100, through the storage unit. Herein, the identification information of the wireless charging device 1100 includes the model name of the corresponding wireless charging device 1100, a specific identification number (UDID) given to the corresponding wireless charging device 1100, MAC address information, and MIN (Mobile Identification Number) information.

The Wi-Fi access point 1400 communicates with one or more terminals 1200 in a store.

Further, the Wi-Fi access point 1400 receives the second control signal for adjusting the Wi-Fi transmission intensity of the Wi-Fi access point 1400 transmitted from the server 1300. Herein, the second control signal includes Wi-Fi transmission intensity and identification information of the terminal 1200.

Further, the Wi-Fi access point 1400 provides a Wi-Fi function to the corresponding terminal 1200 with the Wi-Fi transmission intensity corresponding to the second control signal on the basis of the received second control signal.

As described above, when a BLE terminal entering a store moves to a plurality of predetermined sections (or movement lines) through BLE additionally defined in wireless charging of A4WP type, different wireless charging intensity and Wi-Fi transmission intensity for the corresponding terminal can be supplied and a predetermined coupon can be provided to the corresponding terminal by controlling the wireless charging device and the Wi-Fi access point in the corresponding store.

A method of controlling a wireless charging system according to the present invention will be described hereafter in detail with reference FIGS. 10 to 17.

Figure 14:
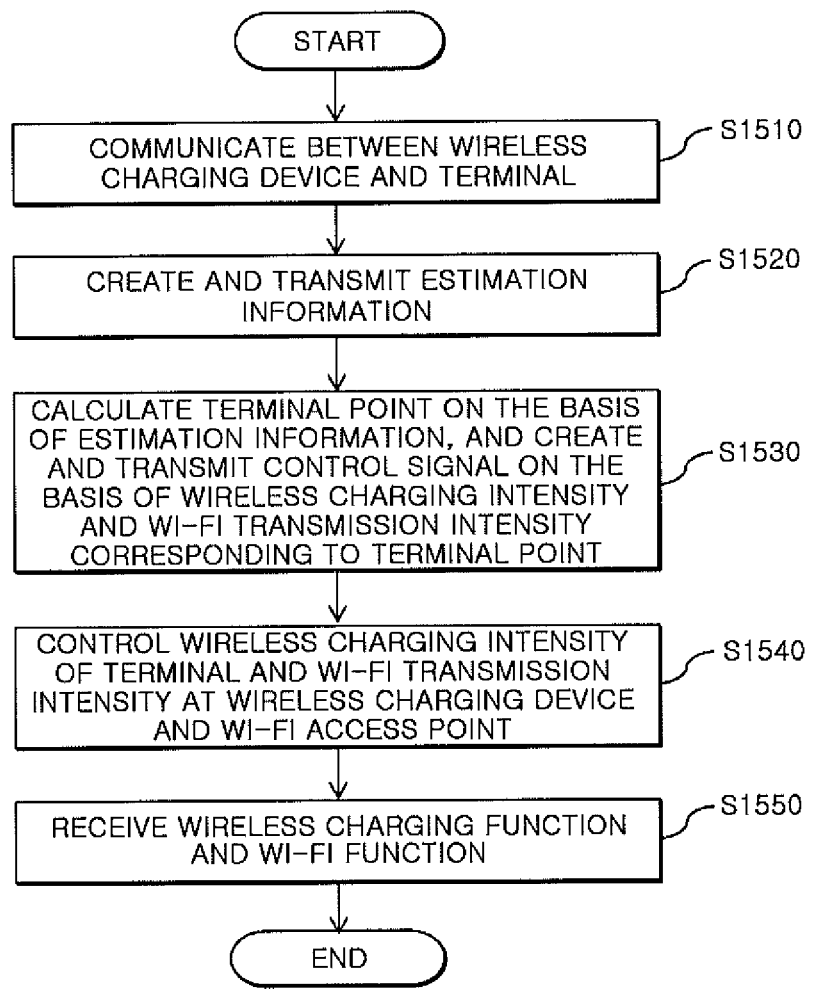
FIG. 14 is a flowchart illustrating a method of controlling a wireless charging system according to an embodiment of the present invention.

FIG. 14 is a flowchart illustrating a method of controlling a wireless charging system according to an embodiment of the present invention.

First, in wireless charging of A4WP type, the wireless charging device (or PTU) 1100 transmits a power beacon signal at predetermined intervals.

Further, one or more terminals 1200 including a PRU close to the wireless charging device 1100 receives a power beacon signal transmitted from the wireless charging device 1100 and connects (or communicates) with the corresponding wireless charging device 1100 on the basis of the received power beacon signal.

For example, the wireless charging device 1100 transmits (or sends) a power beacon signal to a first terminal, a second terminal, and a third terminal each including a PRU entering the store where the corresponding wireless charging device 1100 is disposed. Further, each of first terminal, the second terminal, and the third terminal receives a power beacon signal transmitted from the wireless charging device 1100 and connects with the corresponding wireless charging device 1100 on the basis of the received power beacon signal.

In this process, the wireless charging device 1100 can transmit a power beacon signal to the first terminal, the second terminal, and the third terminal in the store, and may not transmit a power beacon signal to a terminal that is within the radius to which a signal from the wireless charging device 1100 can be transmitted, but is not in the store.

That is, the wireless charging device 1100 checks whether the terminal 1200 enters the stores where the corresponding wireless charging device 1100 is disposed, and can transmit a power beacon signal only to the terminal 1200 entering the corresponding store. Herein, the wireless charging device 1100 can find out (or determines/checks) whether the terminal enters a store, through a change in Wi-Fi signal intensity, a change in beacon signal (or BLE beacon signal)

intensity, and a change in signal intensity of a PTU in the wireless charging device 1100 (S1510).

Thereafter, the terminal 1200 sequentially moves to a plurality of sections set in advance in a store and touches (or tags) products in the sections. Herein, the product contact may include not only tagging, but recognizing (or sensing) actions of a user of the terminal 1200, such as touching a corresponding product, checking a price tag, and reading a description through a sensor unit (not illustrated) in the terminal 1200.

Further, when a specific product in a specific section is touched, the corresponding terminal 1200 creates estimation information (or a response signal) including information about the touched specific product (for contact product information), contact time (or product contact time), information about the corresponding section (or information about the section where the product is disposed), and identification information of the terminal 1200, and transmits the created estimation information to the server 1300. In this process, the identification information of the terminal 1200 includes the MDN, the mobile IP, the mobile MAC, the specific information of the Sim card, and the serial number of the terminal 1200.

As described above, when the terminal touches a specific product in a specific section, it transmits estimation information to the server 1300. Further, the terminal 1200 may create a plurality of items of estimation information about a plurality of products in a plurality of sections to which it sequentially moves, and transmit the created estimation information to the server 1300.

For example, a first terminal sequentially moves to a first section, a second section, a third section, and a fourth section of a plurality of predetermined sections in a store, touches products in the sections (for example, a 11-th product and a 13-th product in the first section, a 21-th product and a 22-th product in the second section, a 32-th product and a 33-th product in the third section, and a 41-th product and a 42-th product in the fourth section), and creates a plurality of items of estimation information of the touched products. Further, the first terminal transmits the created estimation information of the products to the server 1300.

For another example, the second terminal sequentially moves a first section, a second section, a third section, and a fourth section of a plurality of predetermined section in a store and transmits estimation information of a 11-th product touched in the first section to the server 1300. Further, the second terminal transmits respectively estimation of a 22-th product and a 24-th product touched in the second section to which it has moved next, to the sever 1300. Further, the second terminal transmits respectively estimation of a 32-th product and a 33-th product touched in the third section to which it has moved next, to the sever 1300. Further, the second terminal transmits estimation information of a 42-th product touched in the fourth section to which it has moved next, to the server 1300.

For another example, a third terminal sequentially moves to a second section, a first section, a fourth section, and a third section of a plurality of predetermined sections in a store, touches products in the sections (for example, a 11-th product in the first section, a 21-th product and a 22-th product in the second section, a 34-th product in the third section, and a 41-th product and a 42-th product in the fourth section), and creates respectively a plurality of estimation information of the touched products. Further, the third terminal transmits the created estimation information of the product to the server 1300 (S1520).

Thereafter, the server 1300 receives the estimation information transmitted from the terminal 1200 in the store. Herein, the estimation information includes information about a product that the terminal 1200 has touched (or contact product information), contact time, section information (or information about the section including a touched contact), and identification information of the terminal 1200.

Further, the server 1300 analyzes the received estimation information and uses the corresponding analysis result for marketing information.

Further, the server 1300 calculates a terminal point on the basis of at least one of information about a product, contact time, and section information included in a plurality of (or one or more) items of information received in relation to the corresponding terminal 1200.

As described above, the server 1300 can calculate a terminal point on the basis of whether the terminal 1200 has moved in a predetermined order of section information, whether the terminal 1200 has touched one or more predetermined products in each section, whether the terminal 1200 has touched predetermined products for a predetermined time or more, and the like.

Further, the server 1300 finds out wireless charging intensity (or wireless charging sensitivity) corresponding to the calculated terminal point in wireless charging intensity at predetermined terminal points. Further, the server 1300 creates a first control signal including the found-out wireless charging intensity and identification information of the terminal 1200.

Further, the server 1300 finds out Wi-Fi transmission intensity corresponding to the calculated terminal point in Wi-Fi transmission intensity at predetermined terminal points. Further, the server 1300 creates a second control signal including the found-out Wi-Fi transmission intensity and identification information of the terminal 1200.

Further, the server 1300 transmits a first control signal for adjusting the created wireless charging intensity of the wireless charging device 1100 to the wireless charging device 1100. Further, the server 1300 transmits a second control signal for adjusting the created Wi-Fi transmission intensity of the Wi-Fi access point 1400 to the Wi-Fi access point 1400.

For example, as illustrated in FIG. 15, when predetermined section information includes sequentially a first section, a second section, a third section, and a fourth section, a 11-th product and a 13-th product in the first section, a 22-th product and a 24-th product in the second section, a 33-th product and a 34-th product in the third section, and a 41-th product and a 42-th product in the fourth section are set as necessary contact products, and the contact time is set as 1100 seconds in the first section, 50 seconds in the second section, 1100 seconds in the third section, and 1100 seconds in the fourth section, the server 1300, as illustrated in FIG. 16, estimates the terminal point (for example, 82% as illustrated in FIG. 16) of the corresponding terminal 1200 on the basis of the information about the products (for example, including the 11-th product and the 13-th product in the first section, the 21-th product and the 22-th product in the second section, the 32-th product and the 33-th product in the third section, and the 41-th product and the 42-th product in the fourth section) in the sections, which is the information about the contact products included in estimation information transmitted from the first terminal (or a user 1), the contact time in the sections (for example, including 20 seconds in the first section, 50 seconds in the second section, 1100 seconds in the third section, and 1200 seconds in the fourth section), and the section information (for example, including sequentially the first section, the second section, the third section, and the fourth section) about the area to which the terminal 1200 has moved. Further, the server 1300 checks the wireless charging intensity (for example 82%) corresponding to the calculated terminal point in the wireless charging intensity at predetermined terminal points and creates a first control signal including the checked wireless charging intensity and identification information of the terminal 1200. Further, the server 1300 checks the Wi-Fi transmission intensity (for example 80%) corresponding to the calculated terminal point in the Wi-Fi transmission intensity at predetermined terminal points and creates a second control signal including the checked Wi-Fi transmission intensity and the identification information of the terminal 1200. Further, the server 1300 transmits a first control signal for adjusting the created wireless charging intensity of the wireless charging device 1100 to the wireless charging device 1100. Further, the server 1300 transmits a second control signal for adjusting the created Wi-Fi transmission intensity of the Wi-Fi access point 1400 to the Wi-Fi access point 1400.

For another example, as illustrated in FIG. 15, when predetermined section information includes sequentially a first section, a second section, a third section, and a fourth section, a 11-th product and a 13-th product in the first section, a 22-th product and a 24-th product in the second section, a 33-th product and a 34-th product in the third section, and a 41-th product and a 42-th product in the fourth section are set respectively as necessary contact products, and the contact time for each of sections is set as 1100 seconds in the first section, 50 seconds in the second section, 1100 seconds in the third section, and 1100 seconds in the fourth section, the server 1300 estimates the terminal point of the terminal 1200 on the basis of the information about the products (for example, including the 11-th product in the first section, the 22-th product and the 24-th product in the second section, the 32-th product and the 33-th product in the third section, and the 41-th product in the fourth section) in the sections, which is the information about the contact products included in estimation information transmitted from the second terminal, the contact time in the sections (for example, including 40 seconds in the first section, 30 seconds in the second section, 80 seconds in the third section, and 1100 seconds in the fourth section), and the section information (for example, including sequentially the first section, the second section, the third section, and the fourth section) about the area to which the terminal 1200 has moved. Further, The server 1300 checks the wireless charging intensity (for example, 75%) corresponding to the calculated terminal point in the wireless charging intensity at predetermined terminal points and creates a first control signal including the checked wireless charging intensity and identification information of the terminal 1200. Further, the server 1300 checks the Wi-Fi transmission intensity (for example, 75%) corresponding to the calculated terminal point in the Wi-Fi transmission intensity at predetermined terminal points and creates a second control signal including the checked Wi-Fi transmission intensity and the identification information of the terminal 1200. Further, the server 1300 transmits a first control signal for adjusting the created wireless charging intensity of the wireless charging device 1100 to the wireless charging device 1100. Further, the server 1300 transmits a second control signal for adjusting the created Wi-Fi transmission intensity of the Wi-Fi access point 1400 to the Wi-Fi access point 1400.

For another example, as illustrated in FIG. 15, when predetermined section information includes sequentially a first section, a second section, a third section, and a fourth section, a 11-th product and a 13-th product in the first section, a 22-th product and a 24-th product in the second section, a 33-th product and a 34-th product in the third section, and a 41-th product and a 42-th product in the fourth section are set respectively as necessary contact products, and the contact time is set as 1100 seconds in the first section, 50 seconds in the second section, 1100 seconds in the third section, and 1100 seconds in the fourth section, the server 1300 estimates the terminal point of the terminal 1200 on the basis of the information about the products (for example, including the 11-th product in the first section, the 21-th product and the 22-th product in the second section, the 34-th product in the third section, and the 41-th product and the 42-th product in the fourth section) in the sections, which is the information about the contact products included in estimation information transmitted from the third terminal, the contact time in the sections (for example, 40 seconds in the first section, 50 seconds in the second section, 60 seconds in the third section, and 80 seconds in the fourth section), and the section information (for example, including sequentially the second section, the first section, the fourth section, and the third section) about the area to which the terminal 1200 has moved. Further, the server 1300 checks the wireless charging intensity (for example, 67%) corresponding to the calculated terminal point in the wireless charging intensity at predetermined terminal points and creates a first control signal including the checked wireless charging intensity and identification information of the terminal 1200. Further, the server 1300 checks the Wi-Fi transmission intensity (for example, 60%) corresponding to the calculated terminal point in the Wi-Fi transmission intensity at predetermined terminal points and creates a second control signal including the checked Wi-Fi transmission intensity and the identification information of the terminal 1200. Further, the server 1300 transmits a first control signal for adjusting the created wireless charging intensity of the wireless charging device 1100 to the wireless charging device 1100. Further, the server 1300 transmits a second control signal for adjusting the created Wi-Fi transmission intensity of the Wi-Fi access point 1400 to the Wi-Fi access point 1400.

Further, the server 1300 may provide a coupon set in advance to correspond to the terminal point on the basis of calculated terminal point to the corresponding terminal 1200.

That is, when the calculated terminal point is a predetermined point or more, the server 1300 provides a coupon to the corresponding terminal (S1530).

Thereafter, the wireless charging device 1100 and the Wi-Fi access point 1400 respectively receives the first control signal for adjusting the wireless charging intensity of the wireless charging device 1100 transmitted from the server 1300 and the second control signal for adjusting the Wi-Fi transmission intensity of the Wi-Fi access point 1400.

Further, the wireless charging device 1100 provides a wireless charging function to the corresponding terminal 1200 with the wireless charging intensity corresponding to the first control signal on the basis of the first control signal for adjusting the received wireless charging intensity of the wireless charging device 1100.

Further, the Wi-Fi access point 1400 provides a Wi-Fi function to the corresponding terminal 1200 with the Wi-Fi transmission intensity corresponding to the second control signal on the basis of the received second control signal for adjusting the Wi-Fi transmission intensity of the Wi-Fi access point 1400.

For example, as illustrated in FIG. 17 exhibiting information about wireless charging intensity and Wi-Fi transmission intensity for each terminal, the wireless charging device 1100 receives the first control signal (for example, including information about the wireless charging intensity corresponding to 82% and the identification information of the terminal 1200) transmitted from the server 1300 and provides a wireless charging function to the corresponding terminal 1200 (for example, the first terminal) with the wireless charging intensity (for example, 82%) corresponding to the received first control signal.

Further, as illustrated in FIG. 17, the Wi-Fi access point 1400 receives the second control signal (for example, including information about the Wi-Fi transmission intensity corresponding to 80% and the identification information of the terminal 1200) transmitted from the server 1300 and provides a Wi-Fi function to the corresponding terminal 1200 (for example, the first terminal) with the Wi-Fi transmission intensity (for example, 80%) corresponding to the received second control signal.

Thereafter, the corresponding terminal 1200 receives a wireless charging function and a Wi-Fi function respectively provided from the wireless charging device 1100 and the Wi-Fi access point 1400 on the basis of a first control signal for adjusting the wireless charging intensity created respectively by the server 1300 and a second control signal for adjusting the Wi-Fi transmission intensity in accordance with a movement path of the terminal 1200 in the store, whether one or more products set in advance in each section has been touched (or tagged), and whether the terminal 1200 has touched predetermined products for a predetermined time or more.

For example, the terminal 1200 (for example, the first terminal) receives a wireless charging function from the wireless charging device 1100 with the wireless charging intensity (for example, 82%) corresponding to the first control signal.

Further, the terminal 1200 (for example, the first terminal) receives a Wi-Fi function from the Wi-Fi access point 1400 with the Wi-Fi transmission intensity (for example, 80%) corresponding to the second control signal.

A method of controlling a server, a wireless charging device, and a terminal, and a wireless charging system including the server, the wireless charging device and the terminal, according to an embodiment of the present invention, can be recorded in a computer program, and codes and code segments of the computer program can be easily inferred by computer programmers in the field. Further, the computer program is kept in computer readable media and read and executed by a computer, a wireless charging device according to an embodiment of the present invention, a terminal (or user device) including a PRU, a server, and a Wi-Fi access point, such that a server, a wireless charging device, and a terminal, and a wireless charging system including the server, the wireless charging device, and the terminal can be achieved.

The computer readable media include a magnetic recording medium, an optical recording medium, and a carrier wave medium. A computer program for achieving a server, a wireless charging device, and a terminal, and a wireless charging system including the server, the wireless charging device, and the terminal according to an embodiment of the present invention can be stored and installed in a built-in memory of a wireless charging device, a terminal (or user device) including a PRU, a server, a Wi-Fi access point, and the like. Alternatively, an external memory such as a smart card, where a computer program for achieving a server, a wireless charging device, and a terminal, and a wireless charging system including the sever, the wireless charging device, and the terminal according to an embodiment of the present invention is kept and installed, can be mounted in a wireless charging device, a terminal (or user device) including a PRU, a server, and a Wi-Fi access point through an interface.

According to an embodiment of the present invention, as described above, when a BLE terminal entering a store through BLE additionally defined in wireless charging of an A4WP type moves to a plurality of predetermined sections (or movement lines), different wireless charging intensity and Wi-Fi transmission intensity are supplied to the corresponding terminal by controlling a wireless charging device and a Wi-Fi access point in the store and a predetermined coupon is provided to the corresponding terminal, so it is possible to measure a user foot traffic of the terminal. Further, it is possible to reflect a compensation system for each customer by setting configuration of products and adjusting signal intensity, it is possible to independently promote an offline store, and it is possible to induce an interest of a user.

It should be understood that the present invention may be changed and modified by those skilled in the art without departing from the scope of the present invention. Accordingly, the embodiment described herein are provided not to limit, but to explain the spirit of the present invention and the spirit and the scope of the present invention are not limited by the embodiments. The protective range of the present invention should be construed on the basis of claims and all the technical spirits in the equivalent range should be construed as being included in the scope of the right of the present invention.

According the present invention, in any one of cases when a terminal is intended to be charged by a wireless charging device, when a terminal is recognized by a wireless charging device, and when a terminal is in the BLE range of a wireless charging device, a product is selected through a terminal on the basis of product information provided from a POS terminal or a service providing device, a function of ordering the selected product is performed, and a function of paying for the selected product is performed, such that the wireless charging system can be used in more fields and more conveniently used. Accordingly, the present invention can be used in various fields such as a wireless charging system, and advertisement/publicity/marketing.

Further, according to the present invention, in any one of cases when a terminal is charged by a wireless charging device, when a terminal is detached from a wireless charging device after being attached to it, and when a terminal is in the BLE range of a wireless charging device, the terminal is classified into a user group in one table and contents are shared between one or more terminals in the corresponding user group, so the wireless charging system can be used in more fields and more conveniently used. Accordingly, the present invention can be used in various fields such as a wireless charging system, and advertisement/publicity/marketing.

Further, according to the present invention, when a BLE terminal entering a store through BLE additionally defined in wireless charging of an A4WP type moves to a plurality of predetermined sections (or movement lines), different wireless charging intensity and Wi-Fi transmission intensity are supplied to the corresponding terminal by controlling a wireless charging device and a Wi-Fi access point in the corresponding store and a predetermined coupon is provided to the corresponding terminal, so it is possible to measure a user foot traffic of the terminal. Further, it is possible to reflect a compensation system for each customer by setting configuration of products and adjusting signal intensity, it is possible to independently promote an offline store, and it is possible to induce an interest of a user. Therefore, the present invention can be used in various fields such as a wireless charging system, and advertisement/publicity/marketing.

What is claimed is:

1. A system comprising:
an access point communicating with a terminal;
a wireless charging device configured to charge the terminal wirelessly with wireless charging intensity adjusted according to a first signal; and
a server communicating with the access point and the wireless charging device, the server comprising:
  a communication unit configured to:
    receive estimation information indicating (i) information about products that are touched or tagged by the terminal, (ii) times of touching or tagging, and (iii) section information indicating locations of the touched or tagged products in a store, the estimation information transmitted from the terminal positioned in the store,
    send the first control signal adjusting the wireless charging intensity of the wireless charging device to the wireless charging device over a network to charge the terminal with the adjusted wireless charging intensity, and
    send a second control signal adjusting wireless signal transmission intensity of the access point to the access point over the network so that the access point communicates with the terminal using adjusted wireless signal transmission intensity;
  a control unit configured to:
    determine the first control signal and the second control signal based on the information about the products that are touched or tagged by the terminal, the times of the touching or tagging, and the section information, whether the terminal moved across different sections of the store in a predetermined sequence, whether at least a predetermined number of the products in the sections were touched or tagged by the terminal, and whether the touching or tagging were conducted for at least a predetermined time.

2. The system of claim 1, wherein the control unit provides a predetermined coupon to the terminal based on at least one of the information about the products that are touched or tagged by the terminal, the times of the touching or tagging, and the section information indicating locations of the touched products included in the estimation information.

* * * * *